United States Patent [19]

Fujii et al.

[11] Patent Number: 5,542,164
[45] Date of Patent: Aug. 6, 1996

[54] METHOD FOR FORMING A BARB ON A TIP OF A FISHHOOK

[75] Inventors: Shigekatsu Fujii; Naohiro Asada; Tomio Kubo, all of Nishiwaki, Japan

[73] Assignee: Gamakatsu Co., Ltd., Nishiwaki, Japan

[21] Appl. No.: 470,056

[22] Filed: Jun. 6, 1995

Related U.S. Application Data

[62] Division of Ser. No. 301,959, Sep. 7, 1994.

[30] Foreign Application Priority Data

| Aug. 9, 1993 | [JP] | Japan | 5-248704 |
| Jun. 10, 1994 | [JP] | Japan | 6-152850 |
| Jul. 11, 1994 | [JP] | Japan | 6-182988 |
| Aug. 29, 1994 | [JP] | Japan | 6-228850 |

[51] Int. Cl.⁶ .................................................. B21F 45/12
[52] U.S. Cl. ............................................................. 29/9
[58] Field of Search .................................... 43/43.16, 44.82; D22/144; 29/9

[56] References Cited

U.S. PATENT DOCUMENTS

| 154,228 | 8/1874 | Court et al. | 29/9 |
| D. 222,833 | 1/1972 | Fujii et al. | D22/144 |
| 2,054,335 | 9/1936 | Nelson | 29/9 |
| 2,164,807 | 7/1939 | Evans | D22/144 |
| 2,345,197 | 3/1944 | Hirsch et al. | 29/9 |

FOREIGN PATENT DOCUMENTS

| 2607664 | 6/1988 | France | 43/43.16 |
| 900446 | 11/1953 | Germany | 29/9 |
| 400636 | 12/1942 | Italy | 29/9 |
| 60-255227 | 12/1985 | Japan | 29/9 |
| 1204223 | 9/1970 | United Kingdom | 43/43.16 |

*Primary Examiner*—J. Elpel
*Attorney, Agent, or Firm*—Armstrong, Westerman, Hattori, McLeland & Naughton

[57] ABSTRACT

A method for forming a barb of a fishhook including the steps of pressing a thin flat portion of the tip and either cutting or chipping a part of the barb to form a rear face on a side opposite the tip of the hook. At least either upper or lower lateral sides of the hook tip may be cut to form flat or concave lateral cut faces with a sharp edge along a ridge at a juncture of the lateral cut faces.

3 Claims, 27 Drawing Sheets

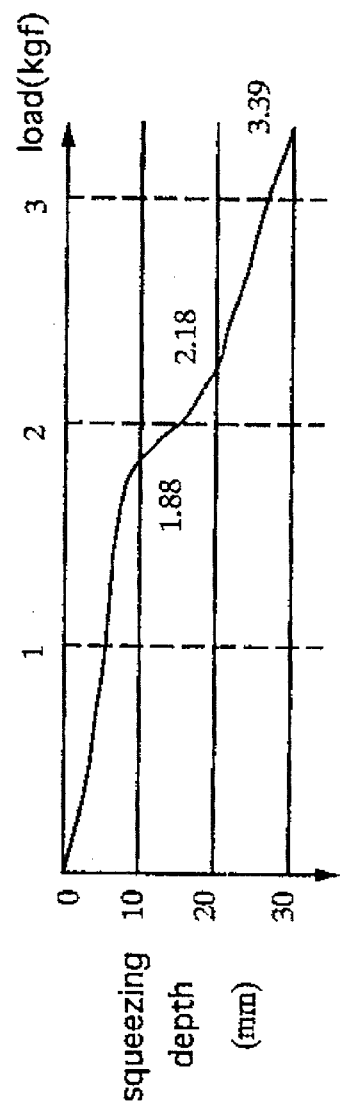
Fig.26(a) present invention
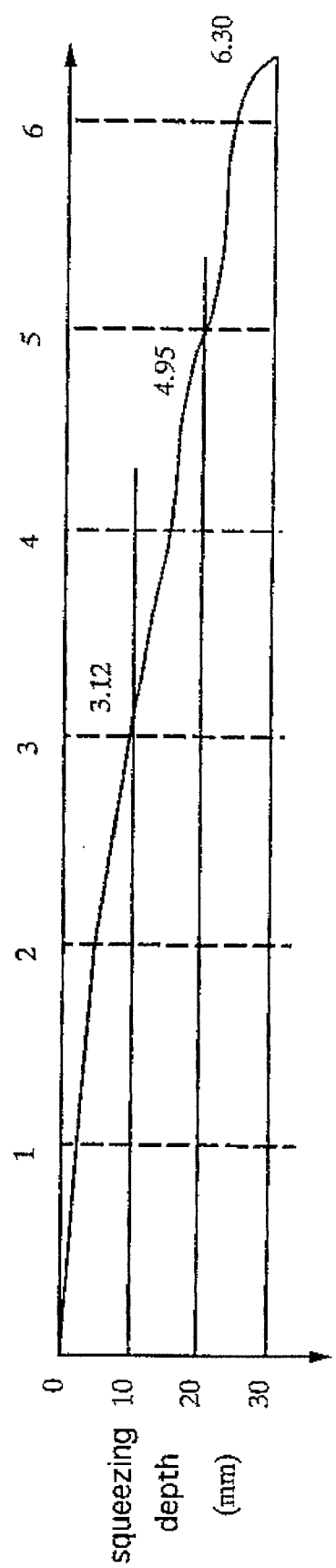
Fig.26(b) conventional fishhooks

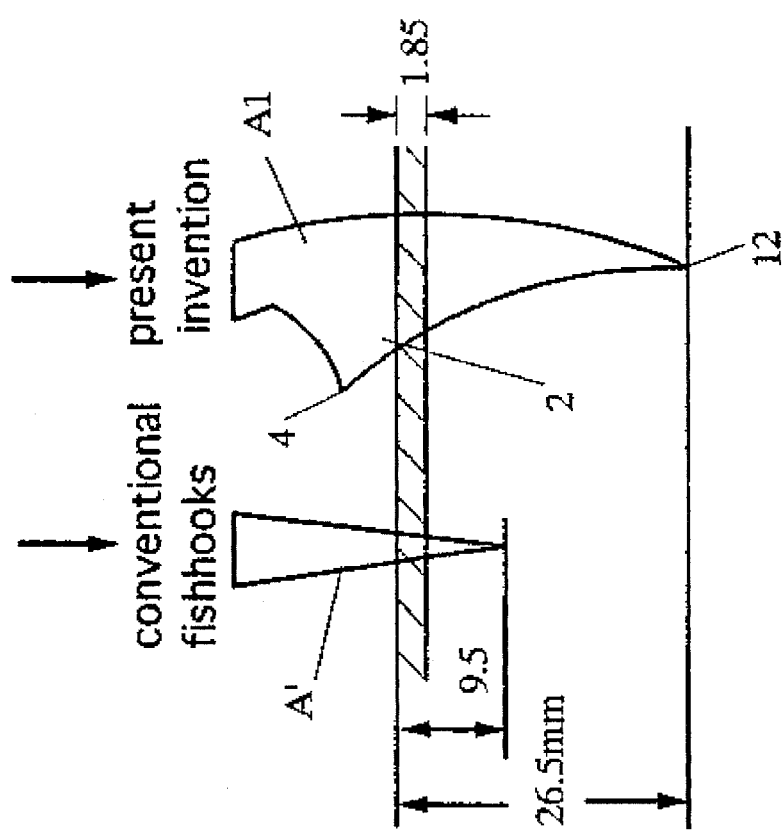

METHOD FOR FORMING A BARB ON A TIP OF A FISHHOOK

This is a division of application Ser. No. 08/301,959 filed Sep. 7, 1994.

BACKGROUND OF THE INVENTION

1. Field of the Invention

The present invention relates to fishhooks having improved barb and hook tip constructions and a novel method of making the same.

2. Description of the Related Arts

Conventional fishhooks A' have a sharp barb 2' cut and raised from the inner side of a tip portion 11' of a fishhook body 1' as shown in FIG. 24 or, alternatively, have a bulged barb 2" formed at the inner side of a fishhook body 1" as shown in FIG. 25.

The former type of fishhooks effectively prevents a fish bait attached thereon from being dislodged therefrom. However, when a fish is caught on the fishhook, the sharp tip 4' of the barb 2' cuts into the flesh of the fish and, in an attempt to remove the fish from the fishhook, the sharp tip of the barb will tear off the flesh of the fish and aggravate the damage to the fish. Especially if a caught fish is to be released, it is necessary to pay special attention to minimize the damage to the fish when removing the fish from the fishhook A'. Though such an operation may be relatively easy for experienced fishermen, inexperienced fishermen may heavily damage a caught fish even if they pay the most careful attention.

As described above, the barb 2' shown in FIG. 24 which is formed by cutting and raising part of the tip portion of the fishhook has a sharp groove 13' formed at the base portion 5' thereof, and sometimes fine cracks are observed at the bottom of the groove 13'. This will lead to the breakage load imposed on of the barb 2' due to an excessive the base portion 5' of the barb 2' when a caught fish is removed from the fishhook A' or when a fish caught on the fishhook is struggling.

Furthermore, the cut and raised barb 2' has a small juncture area at the base portion 5' on the fishhook body 1', i.e., between the barb 2' and the fishhook body 1', and therefore the barb 2' may be easily broken due to an intensive stress occurring at the sharp groove 13' when a large load is applied on the base portion 5' of the barb 2' by a large fish caught on the fishhook.

The latter type of fishhook has been proposed to solve the problem associated with the former type. Unlike the fishhook A' shown in FIG. 24, the fishhook A" having a bulged barb 2" minimizes a damage fish, and the bulged barb 2" may be hardly broken. However, it is very difficult to manufacture the fishhook A" with the bulged barb 2". It is also difficult to attach a bait to the fishhook because the bulged barb obstructs the passage of the bait.

Each of the fishhooks A' and A" of the conventional types has a circular cross section which gradually increases from the tip portion toward the shank portion thereof. When a fish biting a bait is caught on the fishhook A' or A", the tip portion or 11' or 11" of the fishhook A' or A" hooks the mouth of the fish and then squeezes into the palate of the fish while forcibly enlarging the wounded palate and flesh of the fish, However, the tip portion 11' or 11" of the conventional fishhook A' or A" having such a circular cross section causes a significantly large resistance to squeeze into the hard palate of the fish and to forcibly enlarge the wounded palate and flesh of the fish, Therefore, it is very difficult for a fisherman to hook a fish on a blunt tip 12' or 12" of the fishhook A' or A" because the blunt tip can hardly squeeze into the hard palate of the fish.

in view of the aforementioned problems, it is a first object of the present invention to provide a fishhook which has a tip portion with a reduced squeezing resistance for easy hooking of fish, said tip portion having flat or concave cut faces formed by cutting both lateral portions on either or both of upper and lower sides of the tip portion and sharp edges formed along ridges at junctures of the cut faces.

It is a second object of the present invention to provide fishhook which has a barb of a great strength designed to minimize a damage to a fish when removing the fish.

It is a further object of the present invention to provide a method which allows mass production of fishhooks having the aforesaid features.

SUMMARY OF THE INVENTION

In accordance with a fishhook construction of a first exemplary embodiment of the present invention, a fishhook comprises a fishhook body and a tip portion including a hook tip and a barb and extending from said hook tip to said barb, said tip portion having upper lateral cut faces and lower lateral cut faces on upper and lower lateral sides thereof and sharp edges extending from said hook tip to said barb along ridges at junctures of said upper lateral cut faces and of said lower lateral cut faces.

In accordance with a fishhook construction of a second embodiment of the present invention, a fishhook comprises a fishhook body and tip portion including a hook tip and a barb and extending from said hook tip to said barb, said tip portion having upper lateral cut faces on upper lateral sides thereof, a sharp edge formed on the barb side and extending along a ridge at the juncture of said upper lateral cut faces, and a portion formed arcuate in section and defined by bottom and lower lateral surfaces of the tip portion which extend from said hook tip to said barb.

In accordance with a fishhook construction of a third embodiment of the present invention, a fishhook comprises a fishhook body and a tip portion including a hook tip and a barb and extending from said hook tip and said barb, said tip portion having lower lateral cut faces on lower lateral sides thereof, a sharp bottom edge extending along a ridge at a juncture of said lateral cut faces, and a portion formed arcuate in section and defined by top and upper lateral surfaces of the tip portion.

In the fishhook construction of the first exemplary embodiment, four sharp edges are formed along the ridges of the junctures of the lateral cut faces. In the fishhook construction of the second embodiment, the sharp top edge is formed along the top ridge at the juncture of the lateral cut faces. In the fishhook construction of the third embodiment, the sharp bottom edge is formed along the bottom ridge at the juncture of the lateral cut faces.

These fishhook constructions allow the sharp edges formed along the tip portion of the fishhooks to contact and cut into the hard palate and flesh of a fish, thereby reducing the squeezing resistance of the fishhooks. Accordingly, when a fish is caught on the fishhook, the hook tip of the fishhook can easily squeeze into the palate and flesh of the fish.

The squeezing resistance offered by these fishhook constructions is generally half that offered by the conventional fishhook constructions. The squeezing resistances may differ depending on the sharpness of the hook tip and edges, which will be detailed later in an Experiment performed by the invention of the present invention.

In accordance with a fishhook construction of a fourth embodiment of the present invention, a fishhook comprises a fishhook body and a tip portion including a hook tip and a barb and extending from said hook tip to said barb, wherein the straight line (L2) defined between a base end of a rear face of said barb and a tip of the barb forms an angle ($\alpha$) of 90° or larger with respect to a plane of a portion of said fishhook body adjacent the base end in a direction opposite to the hook tip.

According to this construction, the angle formed between the rear face of the barb and said plane is large enough to prevent the tip of the barb from deeply squeezing into the flesh of a fish. Therefore, when a fish is caught on the fishhook and the tip portion of the fishhook including the barb squeezes into the flesh of the fish, the fishhook can be relatively easily removed from the fish without heavily damaging the fish.

Furthermore, the base portion of the barb having a large connection area to the fishhook body is formed integrally with the fishhook body, and a chip or fine cracks will hardly occur on tile rear face of the barb. Therefore, the barb will not be broken from the base portion, even if an excessive force is exerted on the base portion of the barb in an attempt of removing the fishhook from a fish or when a caught fish struggles.

Even if the fishhook happens to snag fisherman's clothes during fishing, the barb of the fishhook is not entangled in the fibers of the clothes and, hence, the fishhook can be easily removed from the clothes. This is because the rear face of the barb projects at a large angle, as previously mentioned.

In accordance with a fishhook construction of a fifth embodiment, which is a variation of the fishhook construction of a fourth embodiment, a fishhook comprises a fishhook body and a tip portion including hook tip and a barb and extending from said hook tip to said barb, wherein the straight Line (L1) defined between a starting base point of said barb on the hook tip side and a tip of the barb forms an angle ($\theta$) of 45° to 90° with respect to the line (L2) defined between a base end of a rear face of the barb and the tip of the barb, and wherein the line defined between the base end of the rear face of the barb and the tip of the barb forms an angle ($\alpha$) of 90° or larger with respect to a plane of a portion of said fishhook body adjacent the base end in a direction opposite to the hook tip.

According to this fishhook construction, the angle ($\theta$) formed between the lines (L1) and (L2) is 45° to 90°, that is, the barb of the fishhook does not have a sharp tip unlike that of the conventional fishhook as shown in FIG. 23. Therefore, in addition to the aforesaid features of the fourth fishhook construction, it is also advantageous that the fishhook can be relatively easily removed from a fish because the tip of the barb smoothly slides from the surface of the wounded flesh of the fish.

The fishhooks according to the fishhook constructions in the aforementioned embodiments may be, characterized in that each have lateral cut faces having a curved contour cross-section which perpendicular to the longitudinal direction of the tip portion, the curved contour being defined by a circle of which the center is positioned outside the curved contour.

With such a characteristic feature, the lateral cut faces of so-called "relief flank" formed on both of the upper and lower sides of the tip portion, as shown in FIG. 12, have a smaller contact area to the palate and flesh of a fish than the flat lateral cut faces. Therefore, the edges formed on the tip portion offer an improved effect of cutting the palate and flesh of a fish and a reduced squeezing resistance.

According to the present invention, there is also provided a first method of producing a fishhook of the present invention which comprises the steps of: pressing an upper part of a tip portion of a fishhook body to form a thin raised portion for barb formation which arcuately projects from the upper part of the tip portion; cutting a part of the thin raised portion on a side opposite to a hook tip to form a rear face of a barb; and bending the fishhook body such that the barb faces opposite a J-shaped shank portion.

This production method allows mass production of fishhooks having highly strong barbs and the use of high-speed steel as well as new materials difficult to be machined such as titanium, because the barb is formed by way of press working. The applicability of new materials may provide fishhooks with new features.

A second method of producing a fishhook of the present invention is a variation of the first production method which includes an additional step of cutting a tip portion. The second production method comprises the steps of: pressing one side of a tip portion of a fishhook body to form a thin raised portion for barb formation arcuately projecting from said one side of the tip portion; chipping a part of the thin raised portion on a side opposite to a hook tip by way of press working to form a rear face of a barb; cutting at least either upper lateral sides or lower lateral sides of the tip portion from the hook tip to the barb to form flat or concave lateral cut faces and to form a sharp edge along a ridge at juncture of said lateral cut faces; and bending the fishhook body such that the barb faces opposite a J-shaped shank portion.

In addition to the features of the first production method, the provision of the sharp edge to the tip portion allows more efficient hooking of a fish on the fishhook.

A third method of producing a fishhook is another variation of the first production method, which comprises the steps of: pressing a tip portion of a fishhook body to form a thin flat portion; cutting at least either upper lateral sides or lower lateral sides of the tip portion to form a sharp hook tip and a barb on an upper surface of the tip portion and to form flat or concave lateral cut faces with a sharp edge along a ridge at juncture of the lateral cut faces; chipping a part of the barb on a side opposite to the hook tip to form a rear face of the barb; and bending the fishhook body such that the barb faces opposite a J-shaped shank portion.

This production method offers the same features as the second production method.

BRIEF DESCRIPTION OF THE DRAWINGS

Reference is now made to the following description of the drawings in which:

FIGS. 26(a)-(b) are graphic representations showing the results of squeezing performance in the disclosure Experiment on the fishhook according to the first embodiment of the present invention and the conventional fishhook, respectively.

FIG. 27 is an explanatory view showing the difference in squeezing depth between the fishhooks A1 and A' evenly loaded with 3 kgf.

DESCRIPTION OF THE PREFERRED EMBODIMENTS

Figure 1:
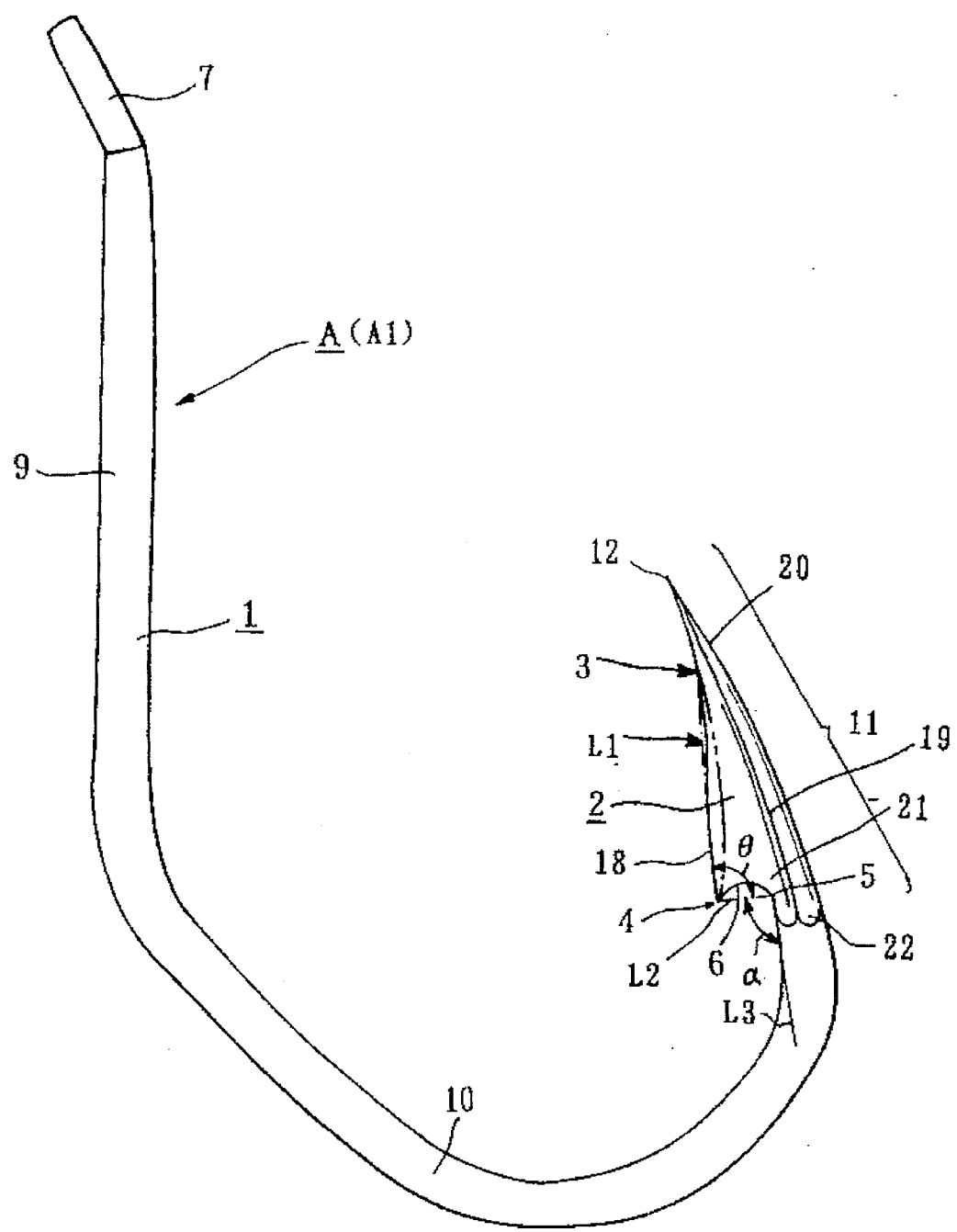
FIG. 1 is a front elevation of a fishhook according to a first exemplary embodiment of the present invention.

Preferred embodiments according to the present invention will hereinafter be described with reference to the attached drawings. The description of the present invention will be made mainly for a first exemplary embodiment. The common description for the other preferred embodiments will be omitted to avoid complexity, and only the distinguishing features will be described. Like reference characters designate like parts throughout the attached drawings.

Figure 2:
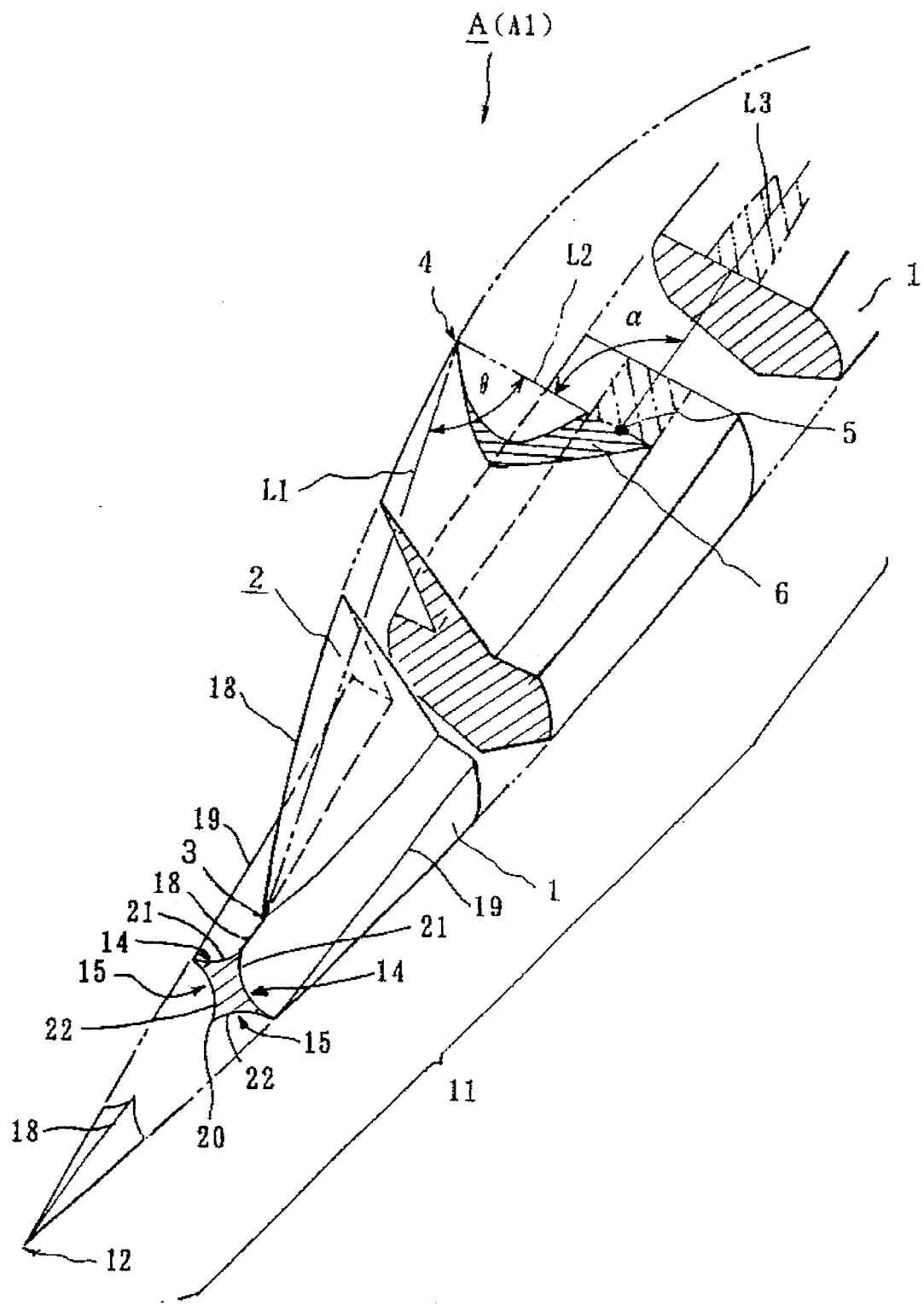
FIG. 2 is an enlarged perspective view illustrating a tip portion of the fishhook according to the first exemplary embodiment of the present invention.
Figure 12:
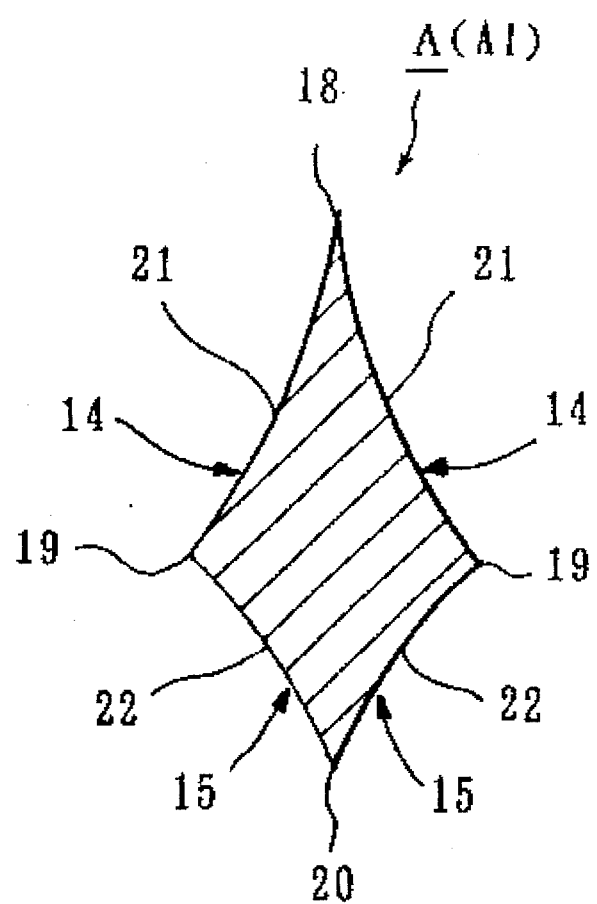
FIG. 12 is a sectional view of a tip portion of the fishhook having relief flanks in accordance with the first examplary embodiment of the present invention shown in FIG. 4.

According to the first exemplary embodiment of a fishhook of the present invention, a fishhook A1 has a shark-finny triangular barb 2 formed along a tip portion 11 of a fishhook body 1, as shown in FIG. 1. The periphery of the tip portion 11 is defined by four lateral cut faces 21 and 22 formed along the tip portion 11 from a hook tip 12 to the barb 2 by cutting upper lateral sides 14 and lower lateral sides 15 of the tip portion 11. Along the ridges at junctures of the cut faces 21 and 22 are formed sharp edges 18, 19 and 20, and the hook tip 12 is also rendered sharp. As shown in FIGS. 2 and 12, the edge 18 on the barb side and the edge 20 on the bottom side have an acute angle, while the edges 19 on the lateral sides have a blunt angle. The cross section perpendicular to the longitudinal direction of the tip portion 11 is of a rectangular shape similar to a rhombus, but not limited thereto. The cross section can be square, wherein all the corner angles of the edges 18, 19 and 20 are 90°.

Examples of the materials of the fishhook A1 include conventionally available high-speed steel, high-carbon steel, titanium and the like, but not limited thereto. Grinding, cutting, and the like machining methods are employed for the machining of the upper lateral sides 14 and lower lateral sides 15.

According to this embodiment, the barb 2 has a basic configuration wherein a straight line L1 defined between a starting point 3 of the barb 2 on the side of the hook tip and a tip 4 of the barb 2 forms an angle (θ) of 45° to 90° with respect to a straight line L2 defined between a base end 5 of a rear face of the barb 2 and the tip 4 of the barb 2. In addition, the line L2 forms an angle (α) of 90° or larger with respect to a plane of a portion of said fishhook body adjacent the base end in the direction opposite to the hook tip 12.

Accordingly, a barb edge 18 formed between the starting point 3 of the barb 2 on the hook tip side and the tip 4 of the barb 2 is inclined at a small angle with respect to the fishhook body, while the rear face 6 of the barb 2 formed between the tip 4 of the barb 2 and the base end 5 of the rear face 6 is inclined at a large angle with respect to the fishhook body 1.

Next, a method of producing the fishhook A1 according to the first embodiment of the present invention will be hereinafter described. Though there are some other methods of producing the fishhook A of the present invention, the description will be made mainly for a first production method. The common description for the other production will be omitted to avoid complexity, and only dismethods criminative features will be described.

Figure 13:
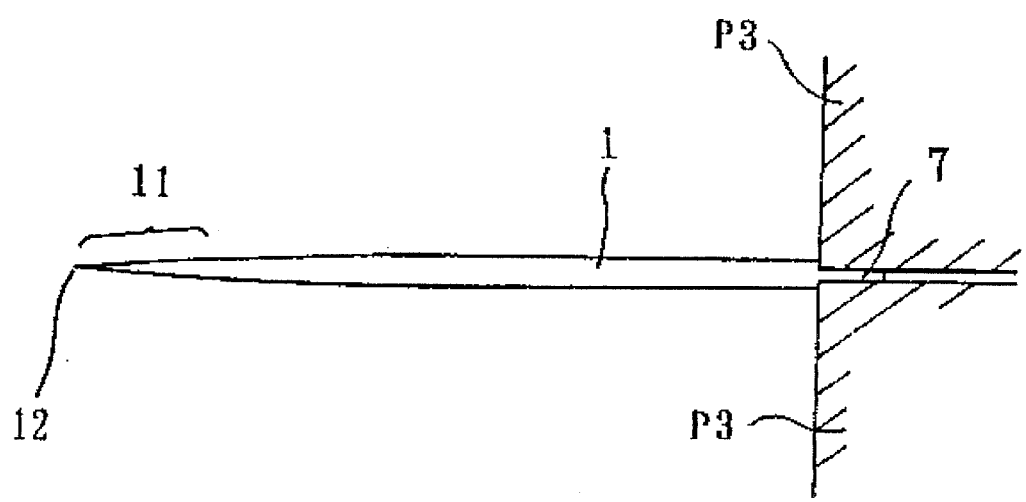
FIG. 13 is a front view of a fishhook blank with its tip portion being sharpened and the other end being pressed to form a flat base portion in accordance with the first method of the present invention.

A wire for producing the fishhook is cut to a predetermined length, and a tip portion 11 is sharpened by grinding. At this time, the cross section of a hook tip is circular. Then, the rear end portion of a fishhook body 1 is pressed by means of a press P3 shown in FIG. 13 to form a fiat base portion 7. It matters little which machining operation precedes, the sharpening of the tip portion 11 or the pressing of the flat base portion 7.

Figure 14:
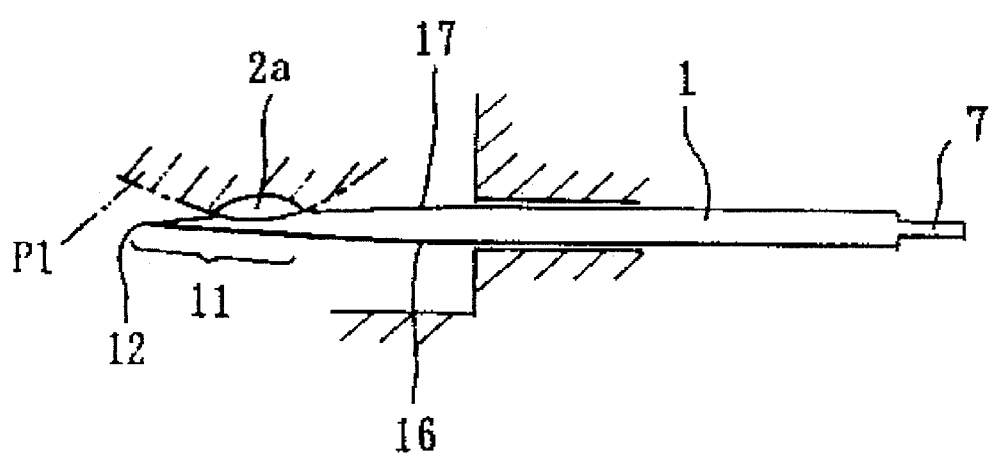
FIG. 14 is a front view illustrating the fishhook blank which is being further machined to form an arcuate raised portion for barb formation by pressing one side of the tip portion shown in FIG. 13.

With the linear fishhook body 1 being secured except for the tip portion 11, a part of the upper surface of the tip portion 11 is pressed with press P1 to form a thin raised portion 2a for barb formation which is arcuately raised from the surface as shown in FIG. 14.

Figure 15:
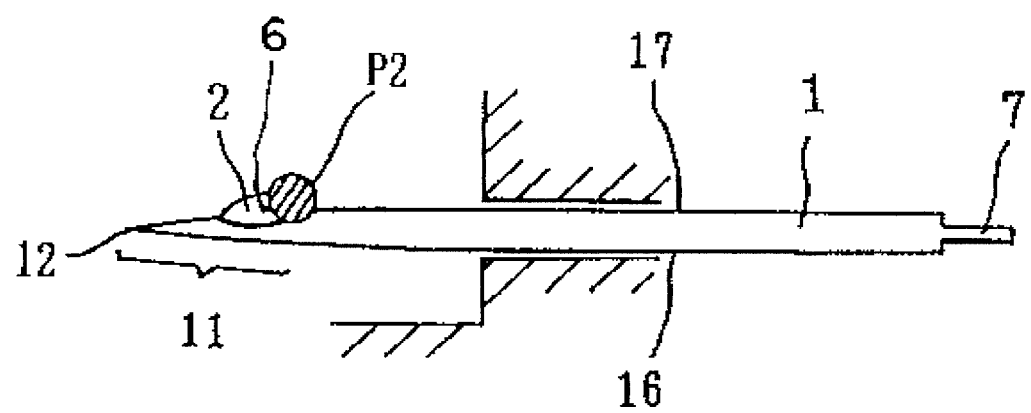
FIG. 15 is a front view illustrating the fishhook blank having a barb trimmed at its rear side by pressing the rear side of the arcuate raised portion shown in FIG. 14.

Subsequently, the rear portion of the raised portion 2a for barb formation is chipped by means of a press P2 to form a curved rear face 6 of a barb 2, as shown in FIG. 15. If a rectangular cut edge is employed for the press P2, a flat rear face 6 of the barb 2 is obtained.

Figure 16:
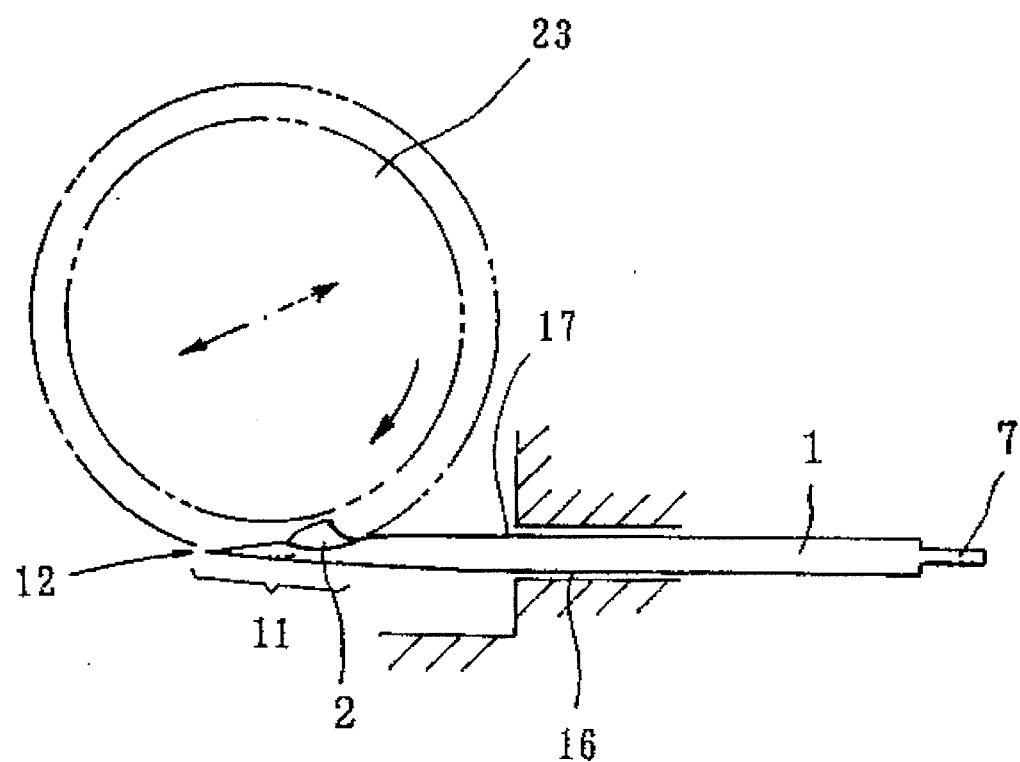
FIG. 16 is a front view illustrating the fishhook blank which is being further machined by grinding the tip portion shown in FIG. 15.

Next, lateral cut faces 21 and 22 are formed along the tip portion 11 of the fishhook body 1. A disk cutter 23 or grinder is moved diagonally from the barb 2 to a hook tip 12 to cut both the upper lateral sides 14 of the tip portion 11 as shown in FIG. 16. Both the lower lateral sides 15 of the tip portion 11 are cut in substantially the same manner, which is not shown in the figure.

The cutting operation is performed on either or both of the upper lateral sides 14 and the lower lateral sides 15. Along the ridges at the junctures of the lateral cut faces 21 and 22 are formed sharp edges 18, 19 and 20.

Though the cutting operation is achieved by either a cutting or a grinding tool, the cutting tool is preferred because it can provide a sharper hook tip 12 than the grinding tool.

Figure 17:
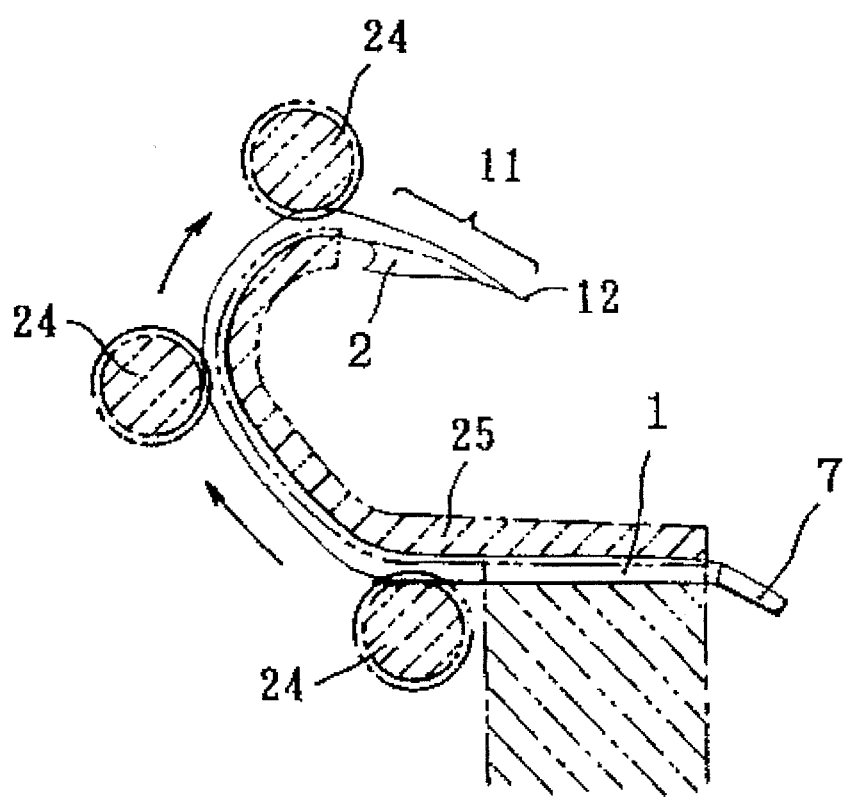
FIG. 17 is a front view illustrating the fishhook blank which is being further machined by bending a fishhook body shown in FIG. 16.
Figure 18A:
FIGS. 18(a-e) a flow chart of one production process of the tip portion in accordance with the second method of the present invention.
Figure 18B:
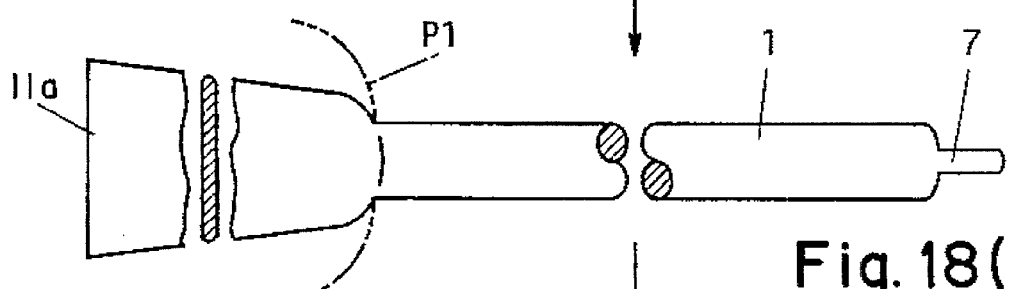
Figure 18C:
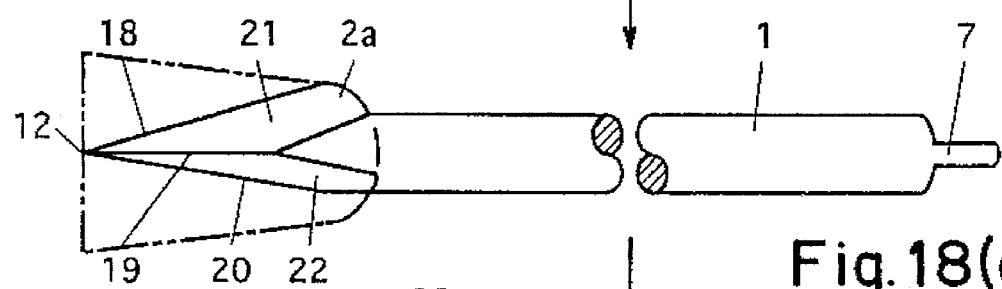
Figure 18D:
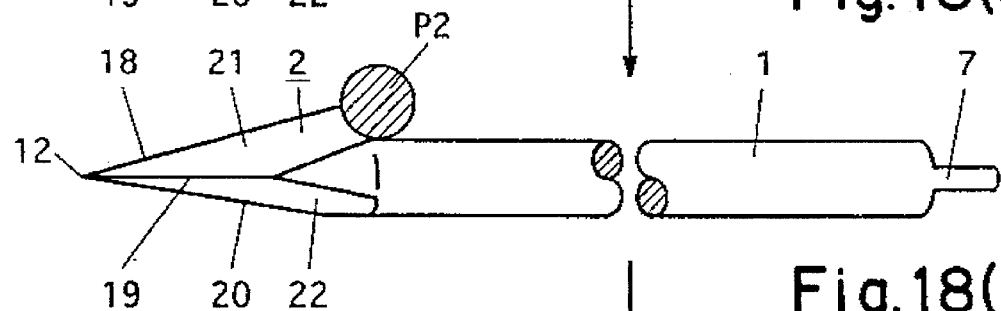
Figure 18E:
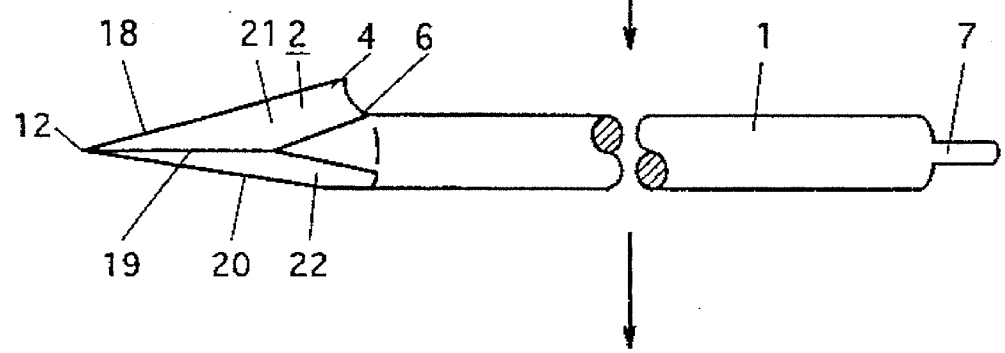
Figure 19A:
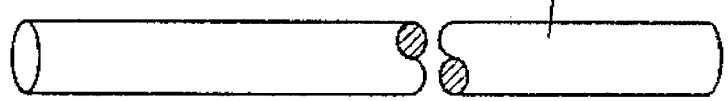
FIGS. 19(a)-(e) show a flow chart of another production process of the tip portion in accordance with the second method of the present invention.
Figure 19B:
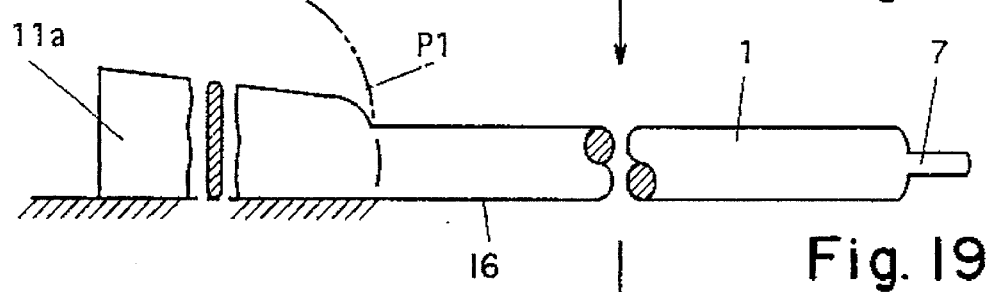
Figure 19C:
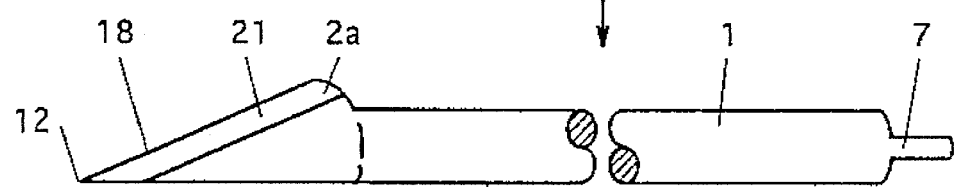
Figure 19D:
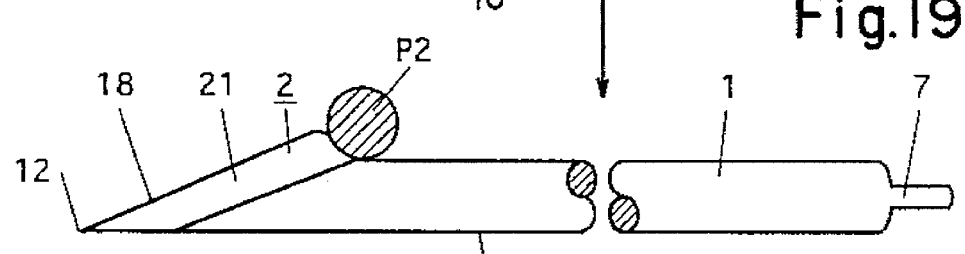
Figure 19E:
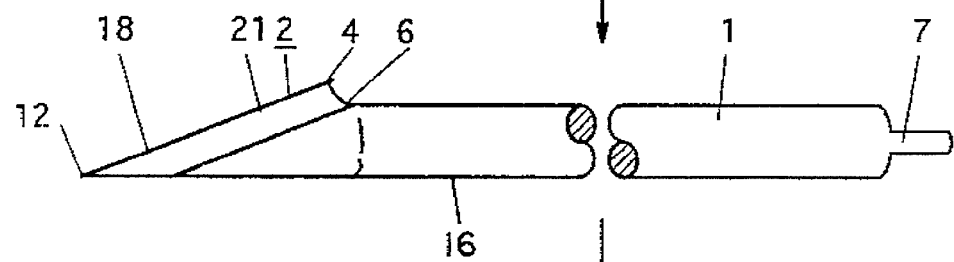
Figure 20A:
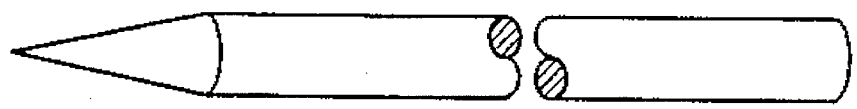
FIGS. 20(a)-(e) show a flow chart of one production process of the tip portion in accordance with a third method of the present invention.
Figure 20B:
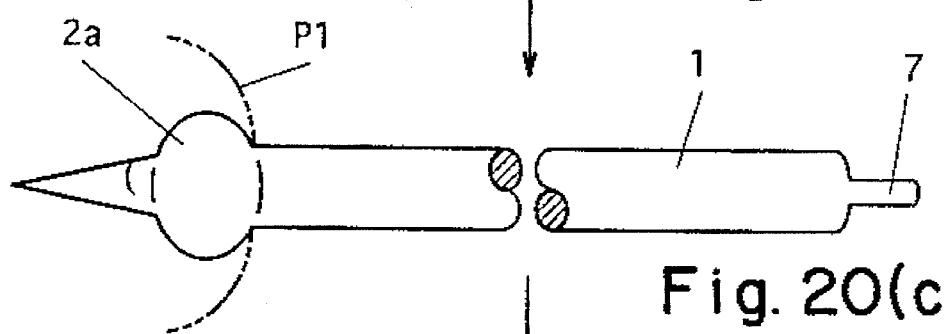
Figure 20C:
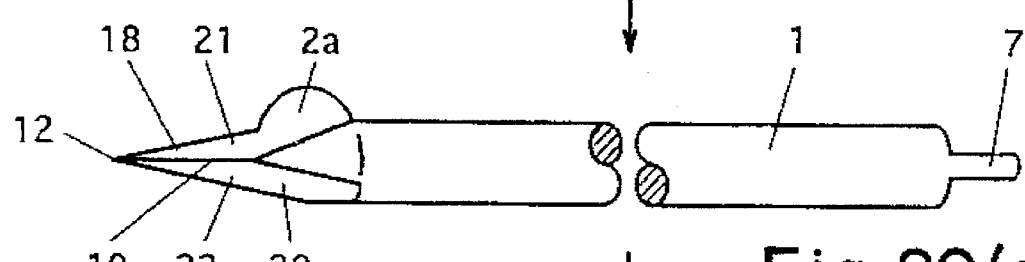
Figure 20D:
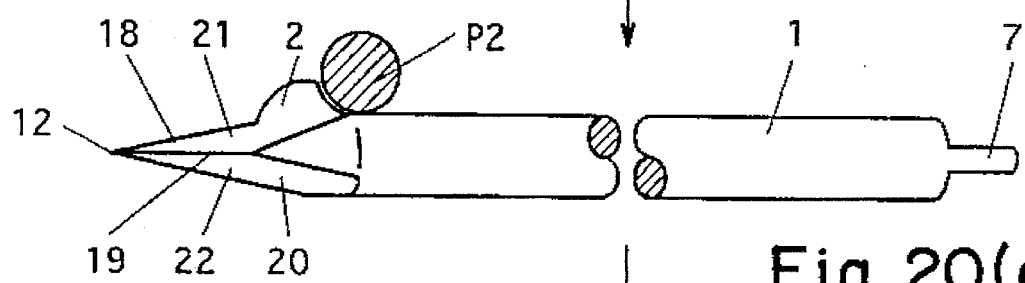
Figure 20E:
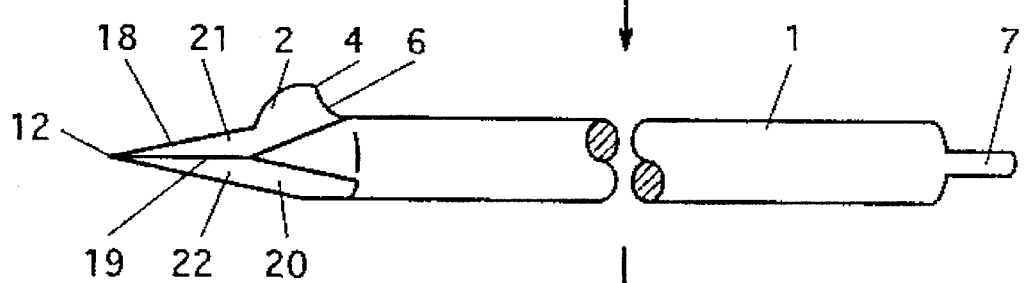
Figure 21A:
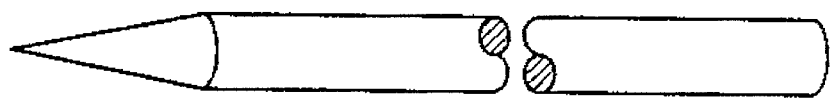
FIGS. 21(a)-(e) show a flow chart of another production process of the tip portion in accordance with the third method of the present invention.
Figure 21B:
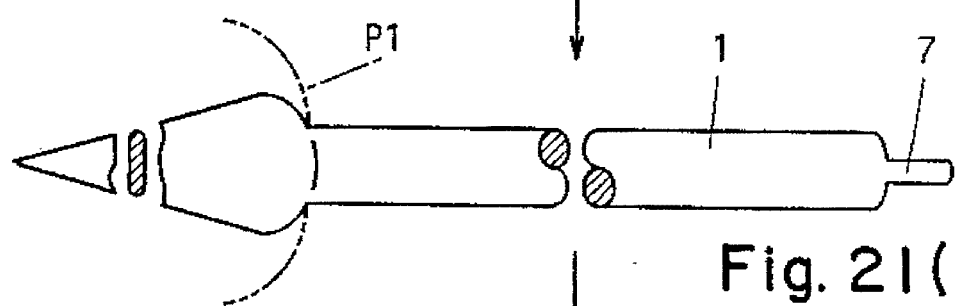
Figure 21C:
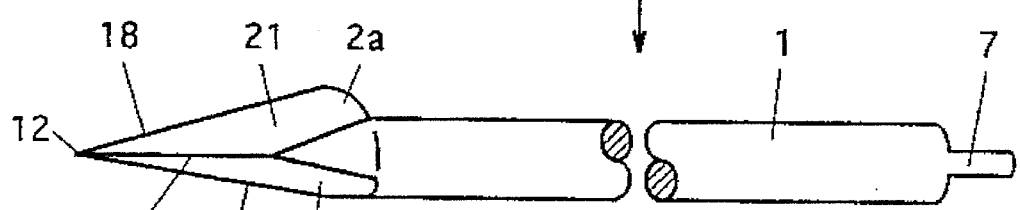
Figure 21D:
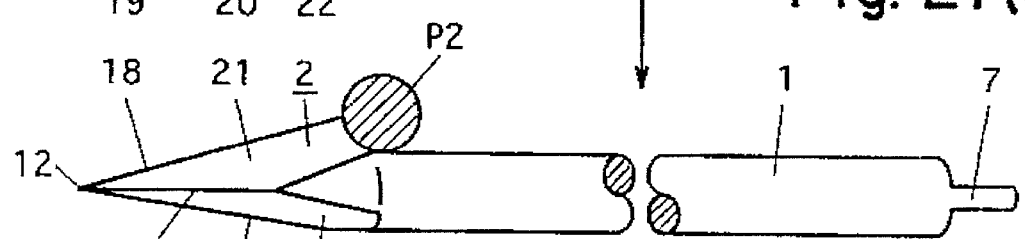
Figure 21E:
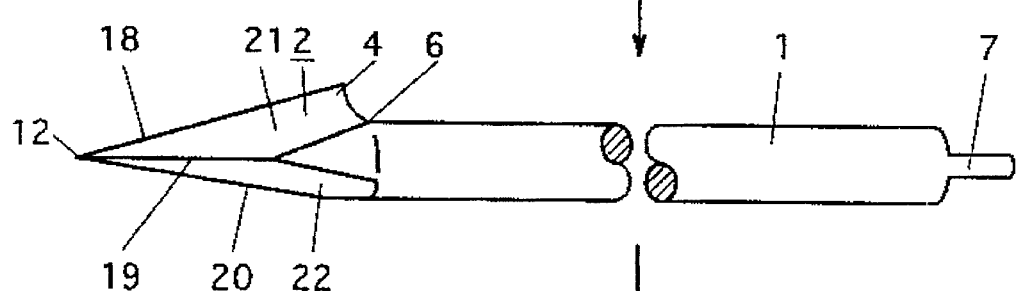
Figure 22A:
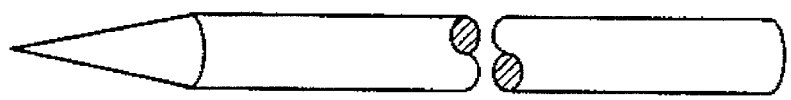
FIGS. 22(a)-(e) show a flow chart of yet another production process of the tip portion accordance with the third method of the present invention.
Figure 22B:
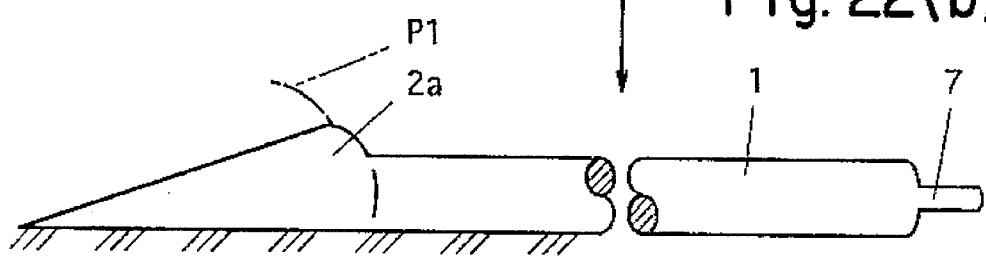
Figure 22C:
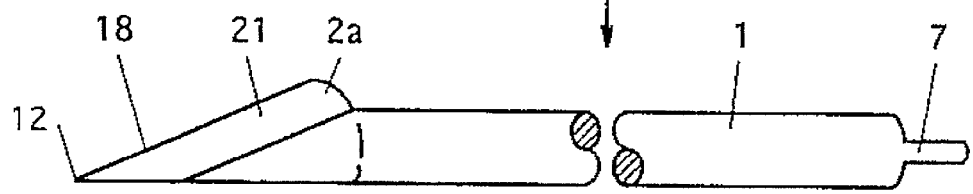
Figure 22D:
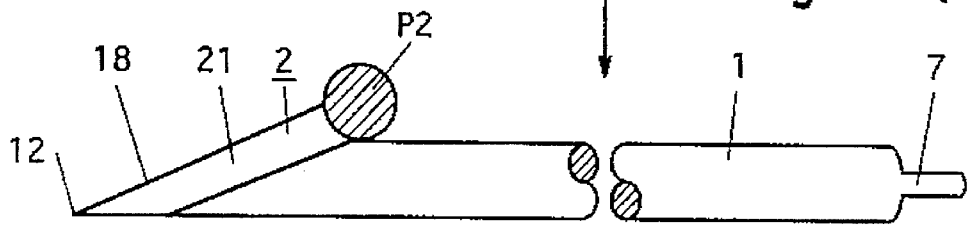
Figure 22E:
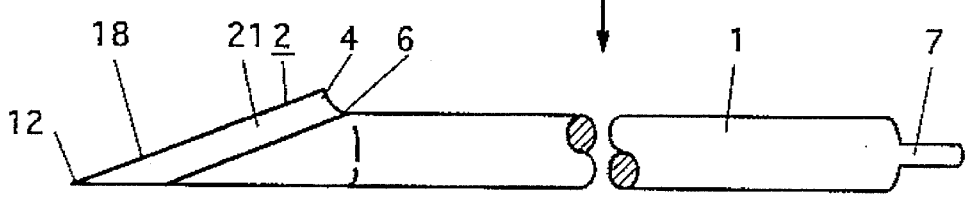
Figure 23A:
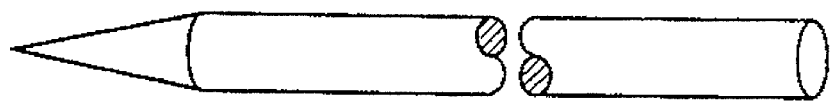
FIGS. 23(a)-(e) a flow chart of one production process of the tip portion in accordance with the fourth method of the present invention.
Figure 23B:
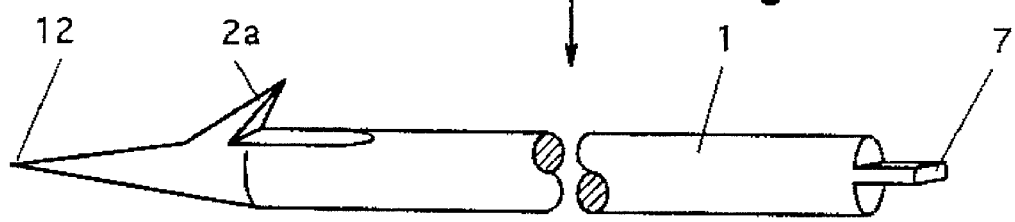
Figure 23C:
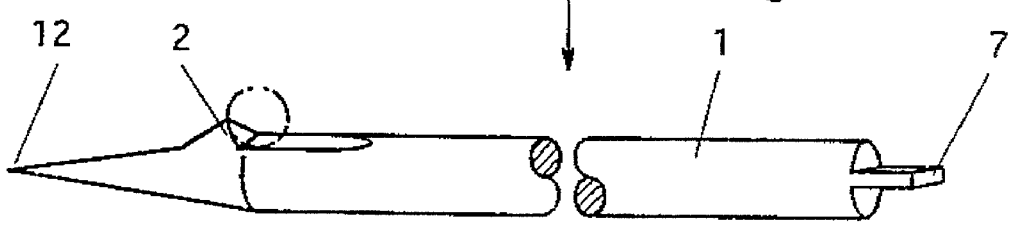
Figure 23D:
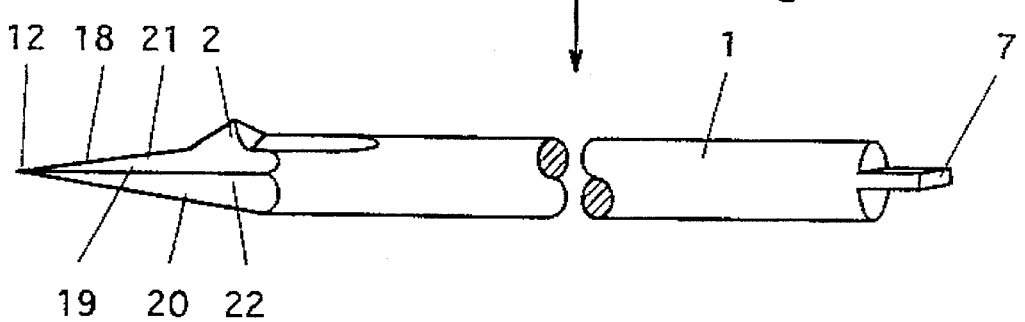
Figure 23E:
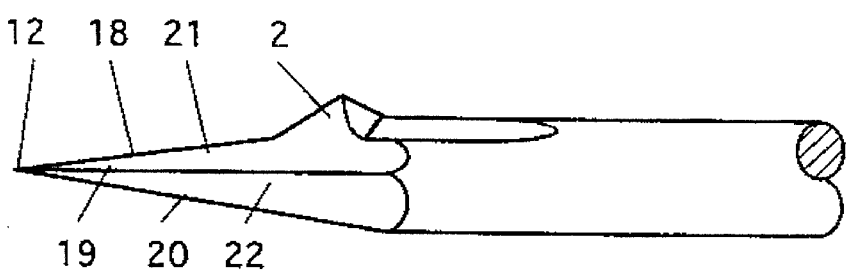

Finally, the shaping of the linear fishhook body 1 is performed by means of a grooved roller 24 and a grooved guide 25. The grooved roller 24 travels over the fishhook body 1 along the grooved guide 25 to bend the tip portion 11 such that the hook tip 12 and the barb 2 respectively faces opposite the flat base portion 7 and a J-shaped shank portion 10 as shown in FIG. 17.

After the machining of the fishhook A1, necessary surface treatment such as plating is made to obtain a complete fishhook A1 according to the first exemplary embodiment of the present invention.

Next, the usage of the fishhook A1 of the present invention will be described, As soon as a fish bites a bait on the fishhook A1, a fisherman hooks the mouth of the fish on the fishhook by quickly operating his fishing rod. The hook tip 12 of the fishhook A1 catching the mouth of the fish sticks the hard palate of the fish, and then the tip portion 11 squeezes into the flesh of the fish. At this time, the palate and flesh of the fish are mainly in contact with the barb edge 18, lateral edges 19 and bottom edge 20, and not the entire periphery of the tip portion 11. That is, the sharp edges 18, 19 and 20 formed along the tip portion 11 contact and tear off the palate and flesh of the fish. As a result, the squeezing resistance of the fishhook A1 of the present invention is rendered much smaller than that of conventional fishhooks which are designed so that the entire periphery of the tip portion thereof contacts and forcibly enlarges the wounded palate and flesh of a fish. Accordingly, the fishhook A1 of the present invention sticks easily and therefore easy hooking of fish.

EXPERIMENT

Figure 24:
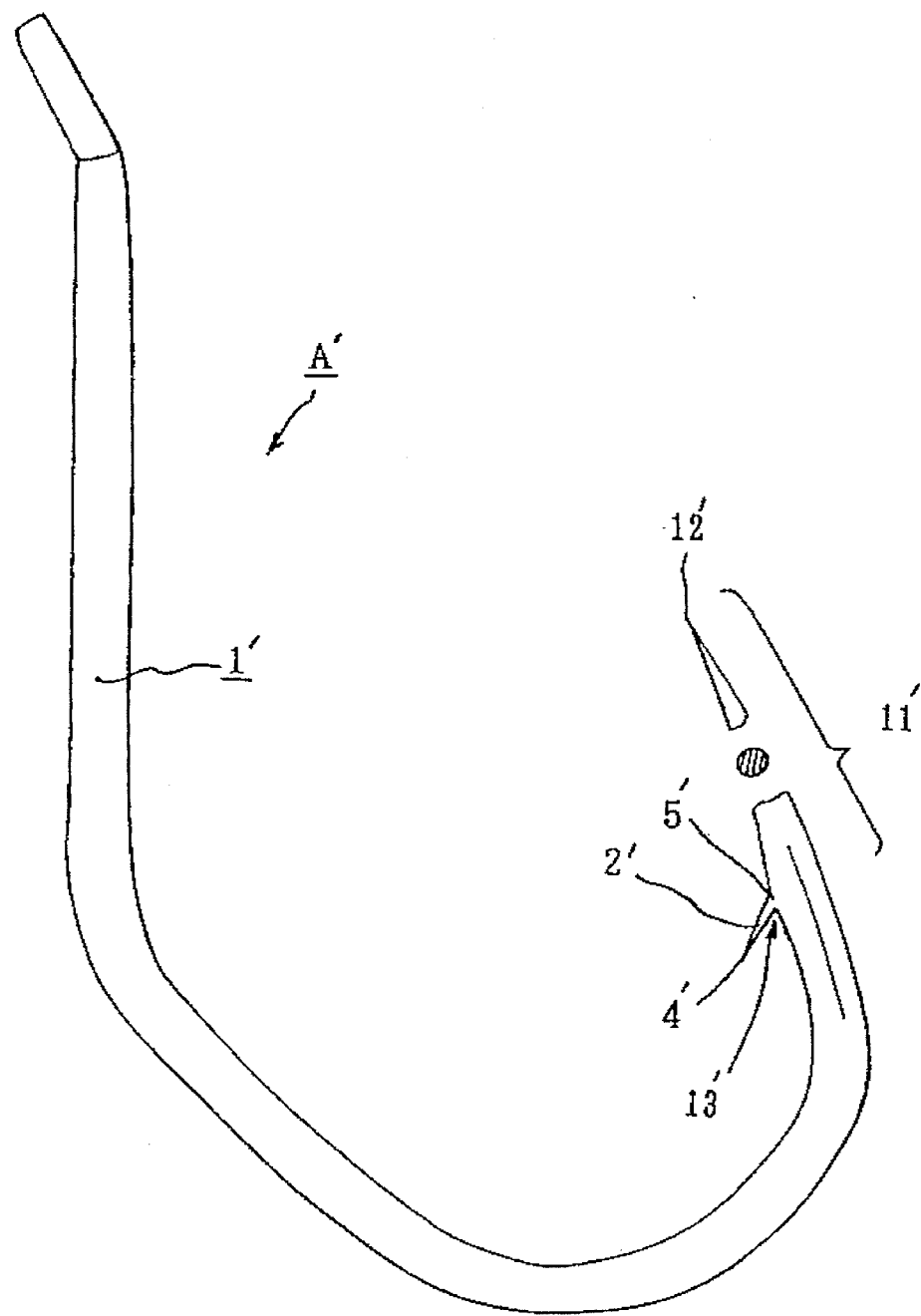
FIG. 24 is a front view of a conventional fishhook.
Figure 25:
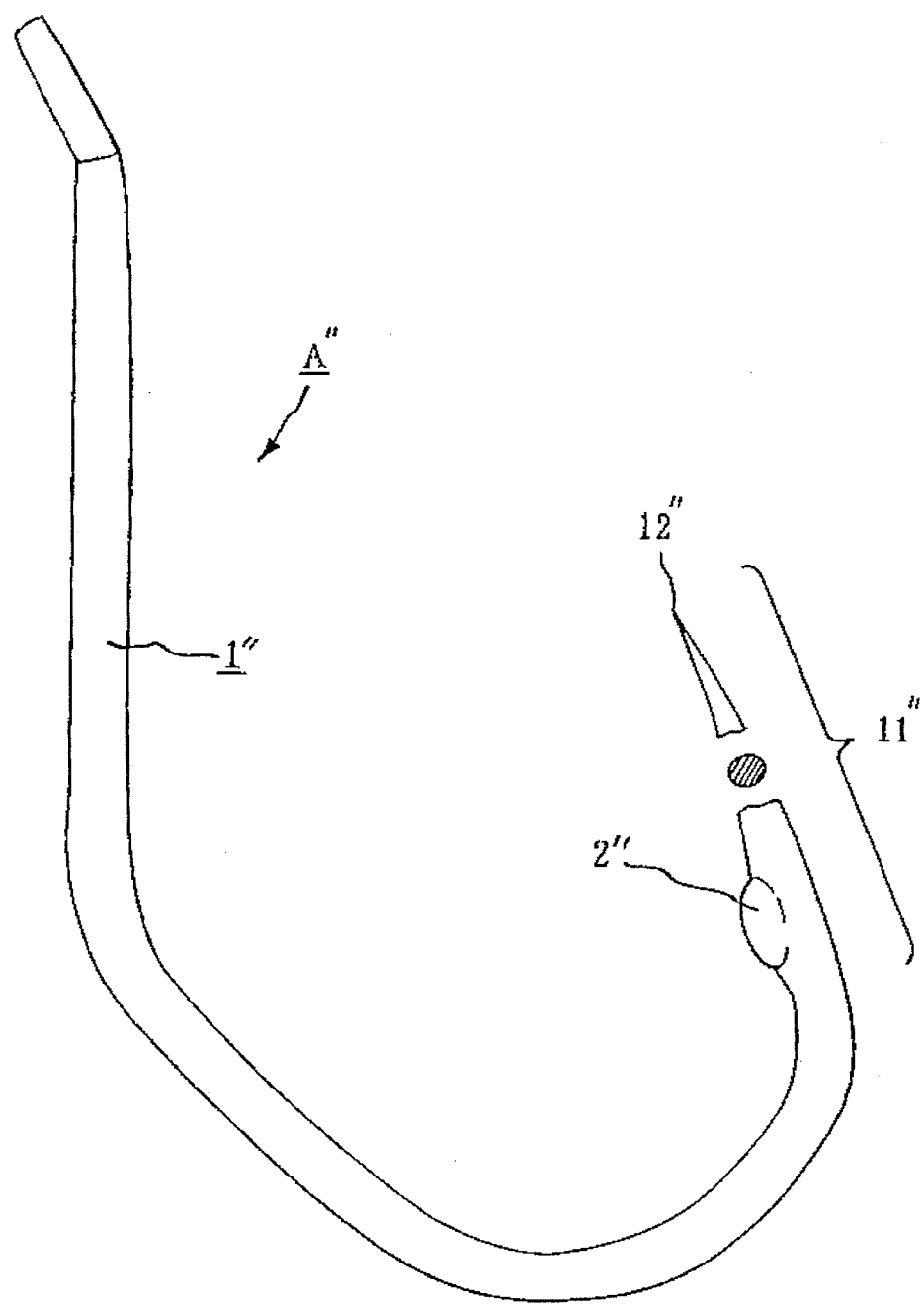
FIG. 25 is a front view of another conventional fishhook.

In this experiment, the squeezing resistance of the fishhook A1 of the present invention shown in FIG. 1 was compared with that of the conventional fishhook shown in FIG. 24. The results were as shown in FIGS. 26(a), 26(b) and 27.

The fishhooks A1 and A' used in this experiment were of enlarged size for ease of experiment. The fishhook A1 was similar to the fishhook of the first embodiment shown in FIG. 3, and the fishhook A' was similar to the conventional fishhook shown FIG. 24. In the fishhook A1 the length of the straight line from the hook tip to the tip of the barb was 40 mm, and the tip portion had a rhombic shape in section with relief flanks. The conventional fishhook A' comprised a rod shaped circular section and having a diameter of 6.5 mm with the tip end being conically sharpened. In this experiment, vinyl sheets with a thickness of 1.85 mm were used as a material to be stuck, which had a characteristic similar to a fish body.

In FIGS. 26(a) and 26(b), the abscissa and the ordinate show the load (kgf) applied to the fishhooks A1 and A' and the squeezing depth of the fishhooks, respectively.

As shown in FIG. 26(b), the conventional fishhook required a load of 3.12 kgf to squeeze into a depth of 10 mm after the hook tip contacted the vinyl sheet, and loads of 4.95 kgf and 6.30 kgf to further squeeze into depths of 20 mm and 30 mm, respectively.

On the other hand, as shown in FIG. 26(a), the fishhook of the present invention required a load of 1.88 kgf to squeeze into a depth of 10 mm after the hook tip 12 contacted the vinyl sheet, and loads of 2.18 kgf and 3.39 kgf to further squeeze into depths of 20 mm and 30 mm, respectively.

The above data shows that the fishhook of the present invention required only 60%, 44% and 53% of the loads required by the conventional fishhook to squeeze into a depth of 10 mm, 20 mm and 30 mm, respectively.

FIG. 27 shows the difference in squeezing depth between the fishhooks A1 and A' evenly loaded with 3 kgf. As seen from FIG. 27, the fishhook A1 of the present invention squeezed to a depth of 26.5 mm, whereas the conventional fishhook A' reached a depth of only 9.5 mm.

As can be understood from this experiment, the fishhook A1 of the present invention exhibits an excellent tear-off effect offered by the sharp edges 18, 19 and 20, which enables rapid squeezing of the hook tip 12 after slight insertion of the hook tip 12.

Figure 11:
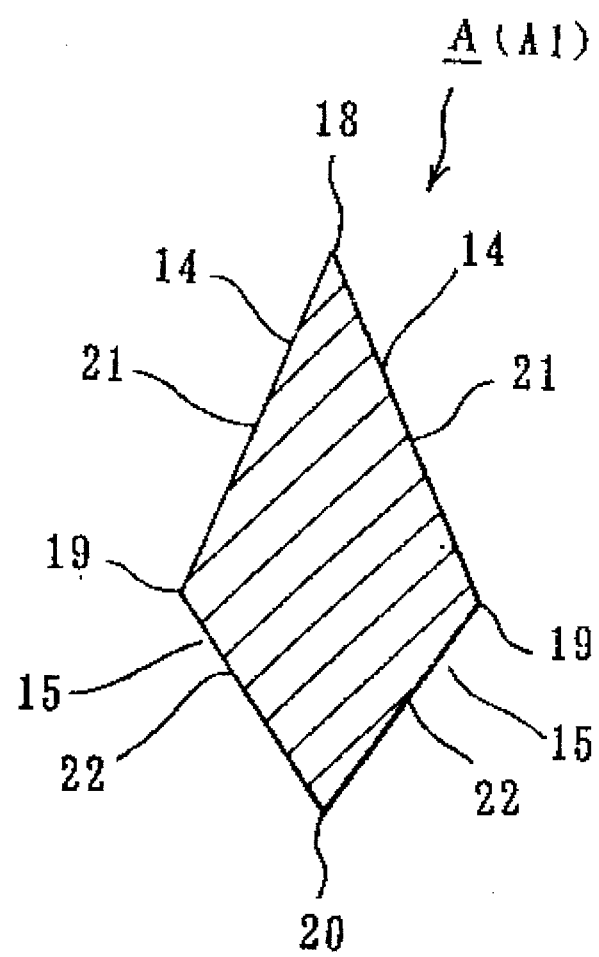
FIG. 11 is a sectional view of a tip portion of the fishhook in accordance with the first examplary embodiment of the present invention shown in FIG. 4.

If the lateral cut faces 21 and 22 are formed into concave surfaces as relief flanks along the longitudinal direction of the tip portion 11, i.e., the curved contour of each of the concave lateral cut faces in cross section perpendicular to the longitudinal direction of the tip portion 11 is defined by a circle of which the center is positioned outside the curved contour, and the cross section is generally rhombic as shown in FIG. 12, the sharpness of the edges 18, 19 and 20 are enhanced. This improves the effect of tearing off the palate and flesh of a fish and, at the same time, reduces a contact area between the concave lateral cut faces 21 and 22 and the palate and flesh of the fish. Accordingly, the fishhook having concave lateral cut faces offers a reduced squeezing resistance compared with that having flat lateral cut faces as shown in FIG. 11.

Figure 3:
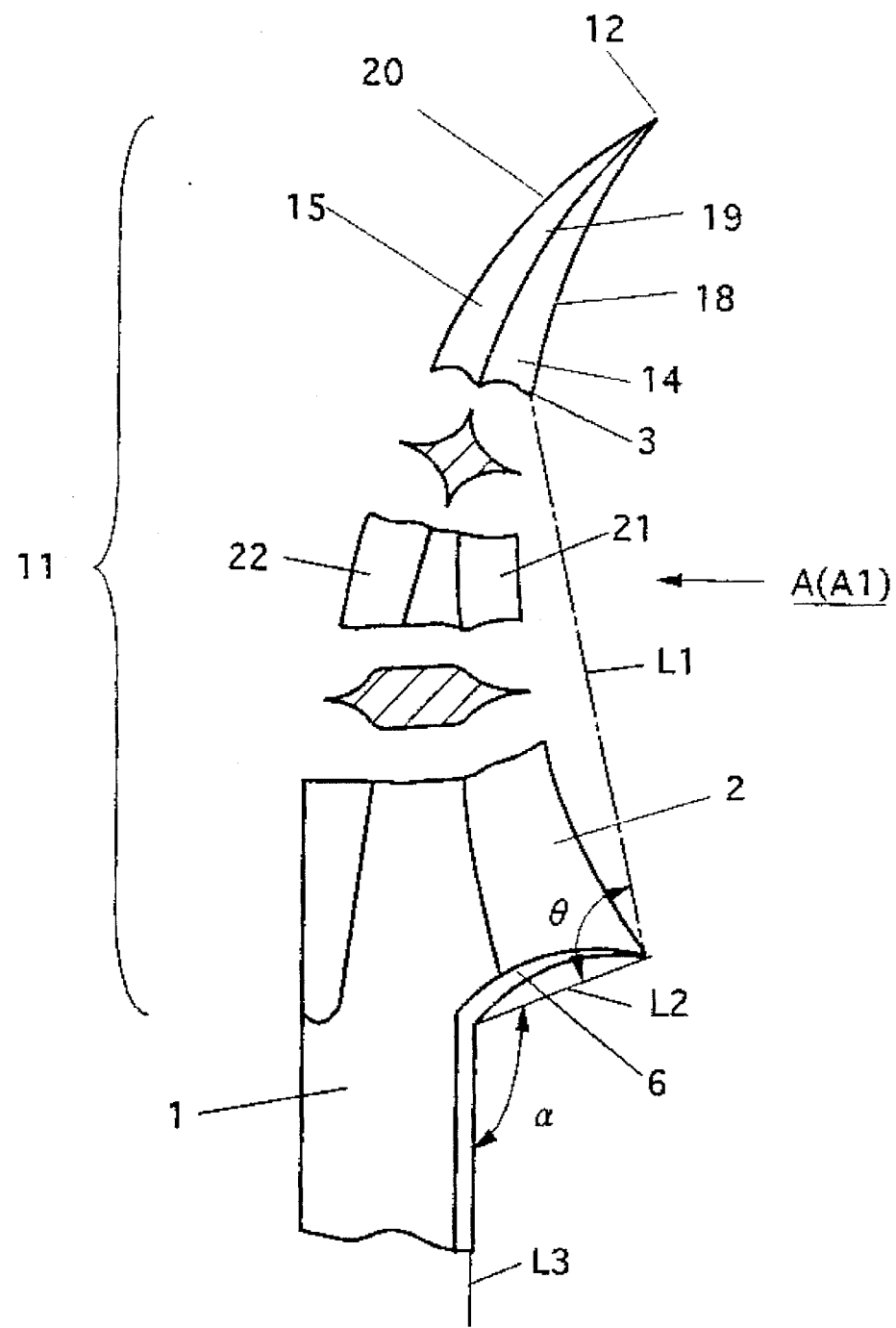
FIG. 3 is an enlarged fragmentary front view partly in section illustrating another example of a tip portion of the fishhook according to the first exemplary embodiment of the present invention.
Figure 4:
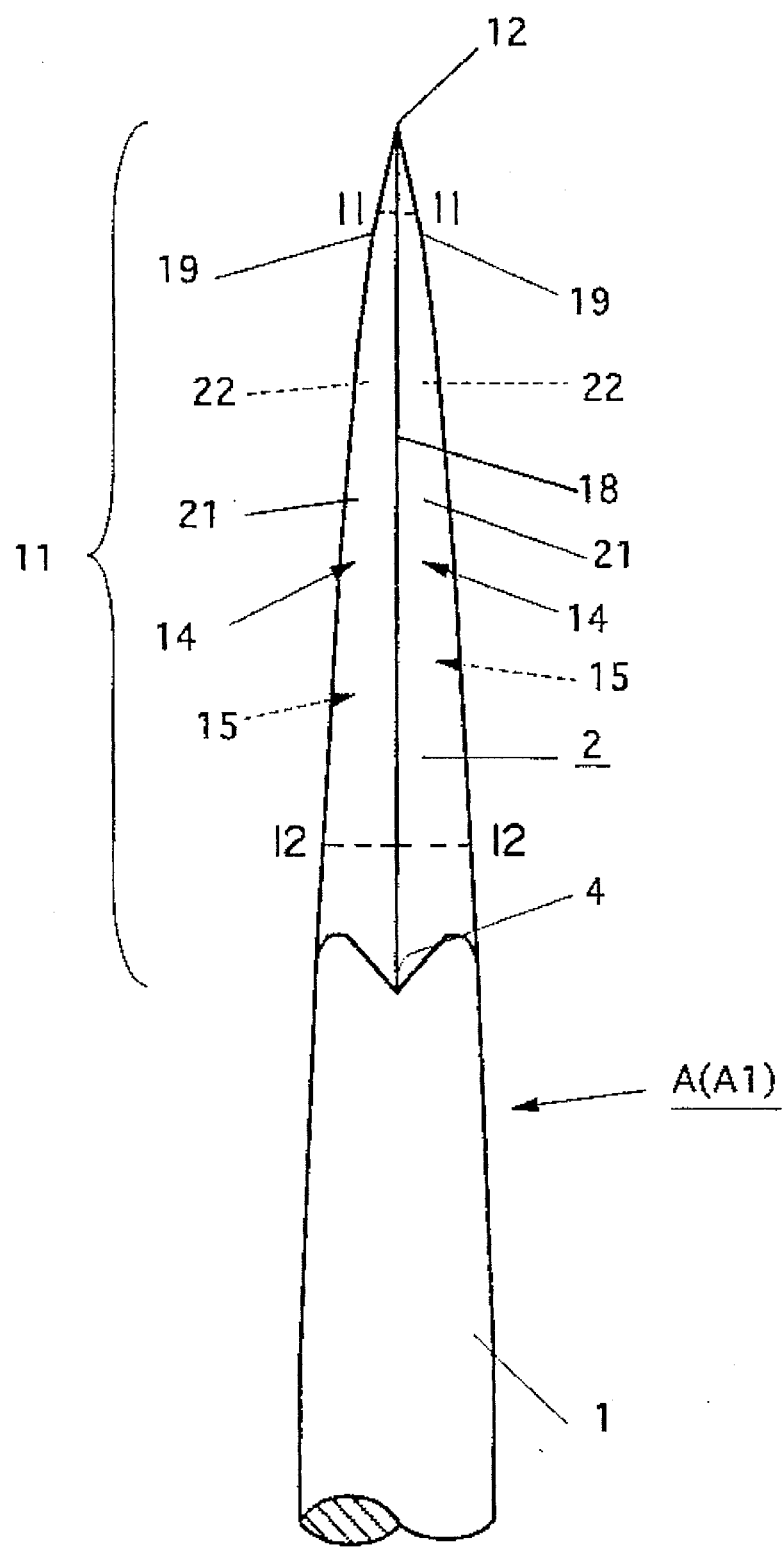
FIG. 4 is a plan view of the tip portion shown in FIG. 3.

FIGS. 3 and 4 show a variation of the first preferred exemplary embodiment A1, wherein the tip portion 11 is sharpened by way of cutting and is bent toward the barb to form a crescent shape. In this case, the tip portion 11 easily squeezes and tears off the flesh of a fish along the thus formed arc.

Figure 5:
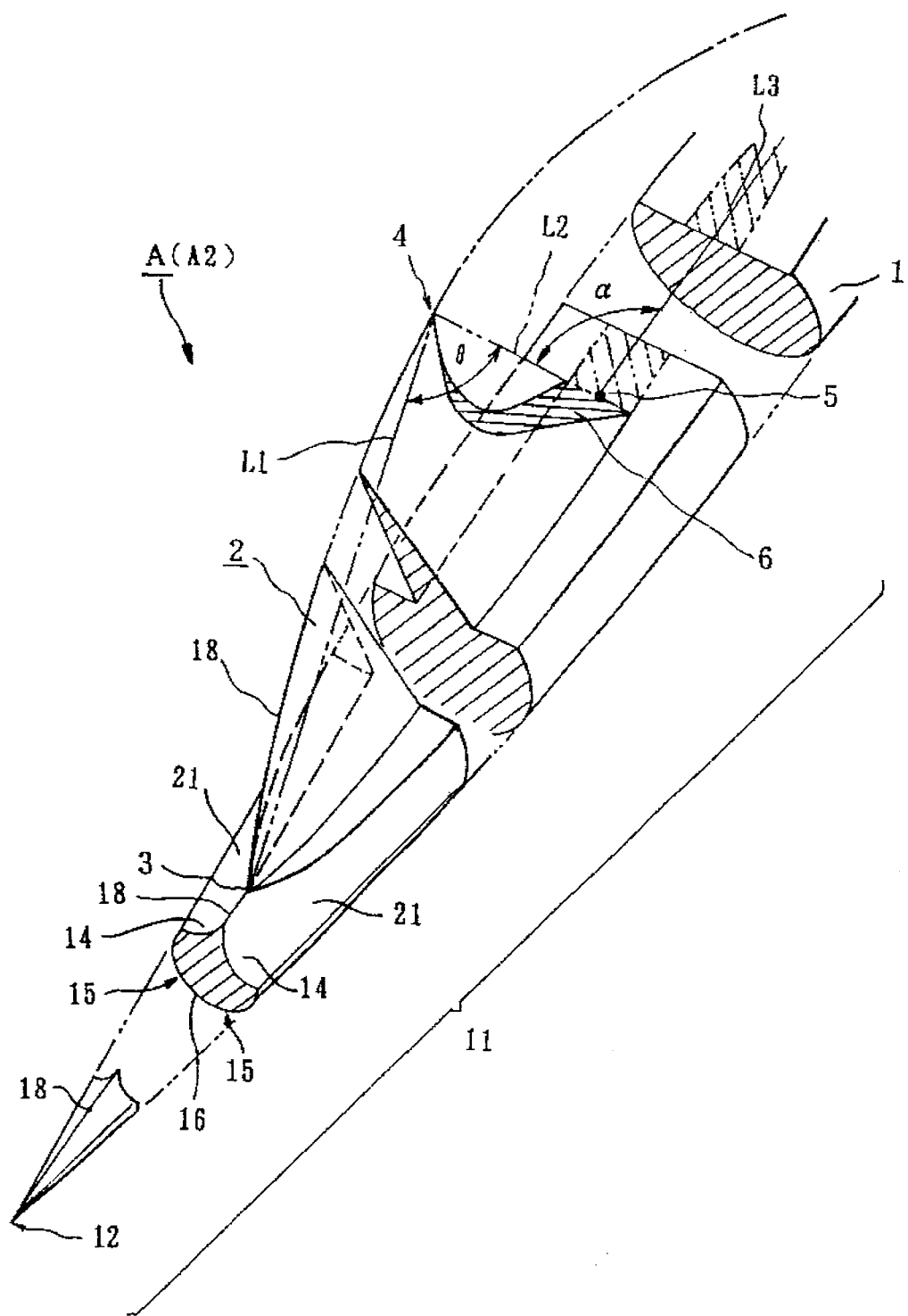
FIG. 5 is an enlarged perspective view illustrating a tip portion of a fishhook according to a second embodiment of the present invention.

A fishhook A2 of a second preferred embodiment is produced in accordance with the first production method. As shown in FIG. 5, the fishhook A2 has upper lateral cut faces 21 formed along a tip portion 11 by cutting both upper lateral sides 14 of the tip portion 11 from a hook tip 12 to a barb 2 and an inverted-V-shaped ridge at the juncture of the upper lateral cut faces 21. Accordingly, the lower portion defined by bottom 16 and lower lateral sides 15 which extends from the hook tip 12 to the barb 2 are still arcuate in cross section. In this case, barb edge 18 is also rendered sharp. This fishhook offers a larger squeezing resistance than that of the first embodiment A1 and the variation thereof shown in FIG. 3, because the lower side of the tip portion is arcuate in cross section. However, the aforesaid sharp barb edge 18 of the barb 2 serves to tear off the palate and flesh of a fish, thereby reducing the squeezing resistance compared with the conventional fishhooks A' and A". Of course, the aforesaid lateral cut faces 21 can be rendered concave.

Figure 6:
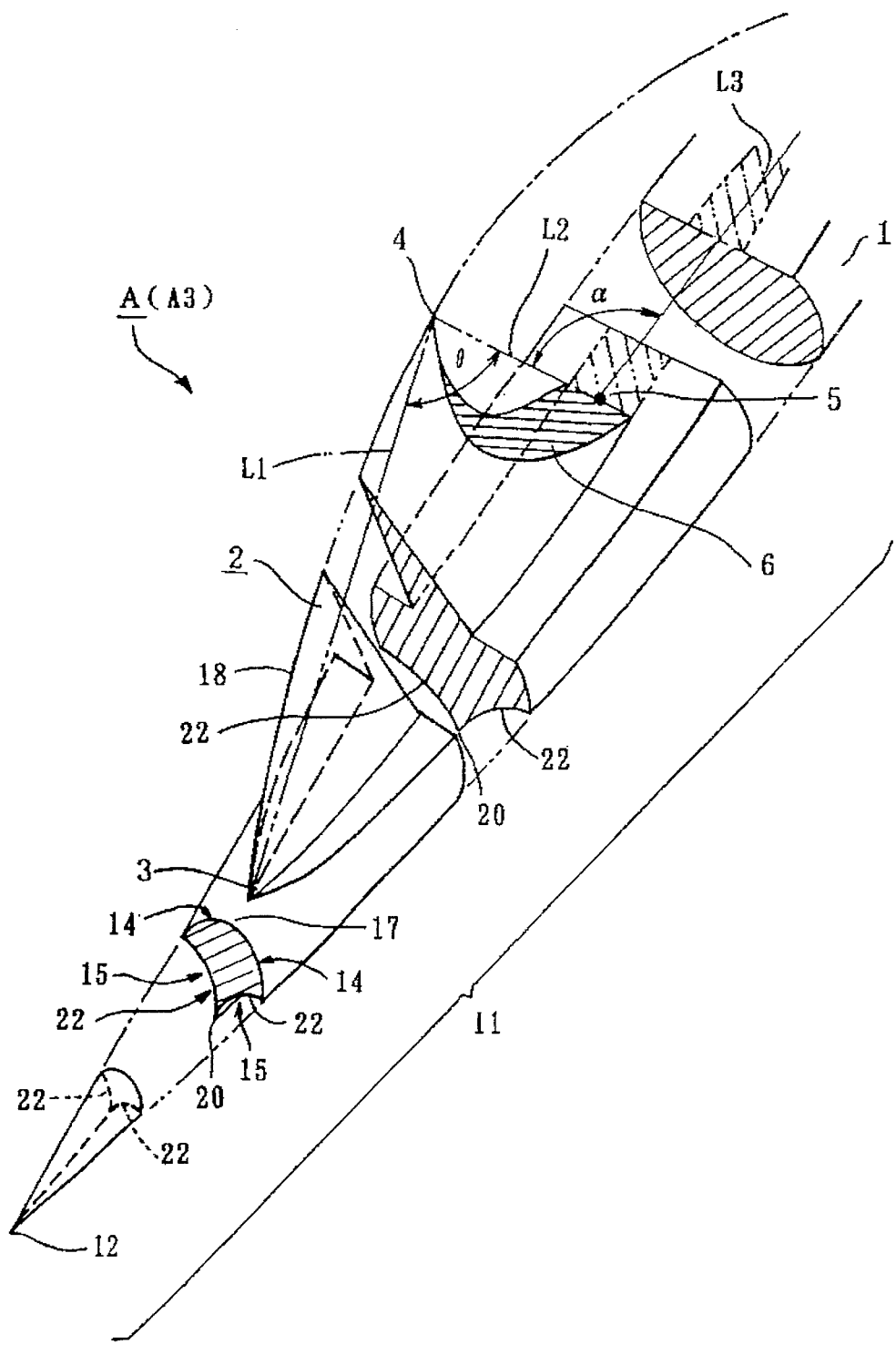
FIG. 6 is an enlarged perspective view illustrating a tip portion of a fishhook according to a third embodiment of the present invention.
Figure 7:
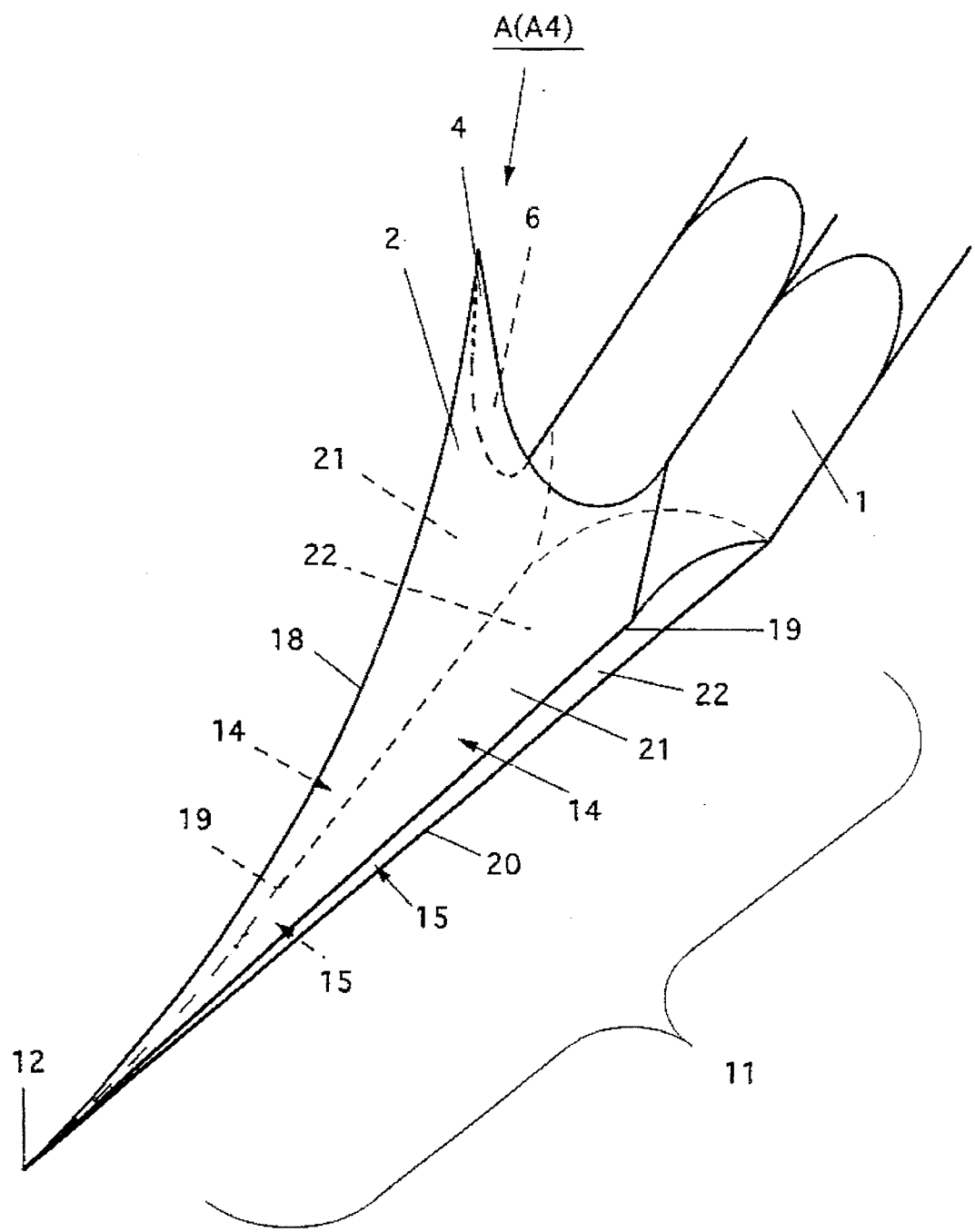
FIG. 7 is an enlarged perspective view illustrating a tip portion of a fishhook of a fourth embodiment produced in accordance with a second or third method of the present invention.
Figure 8:
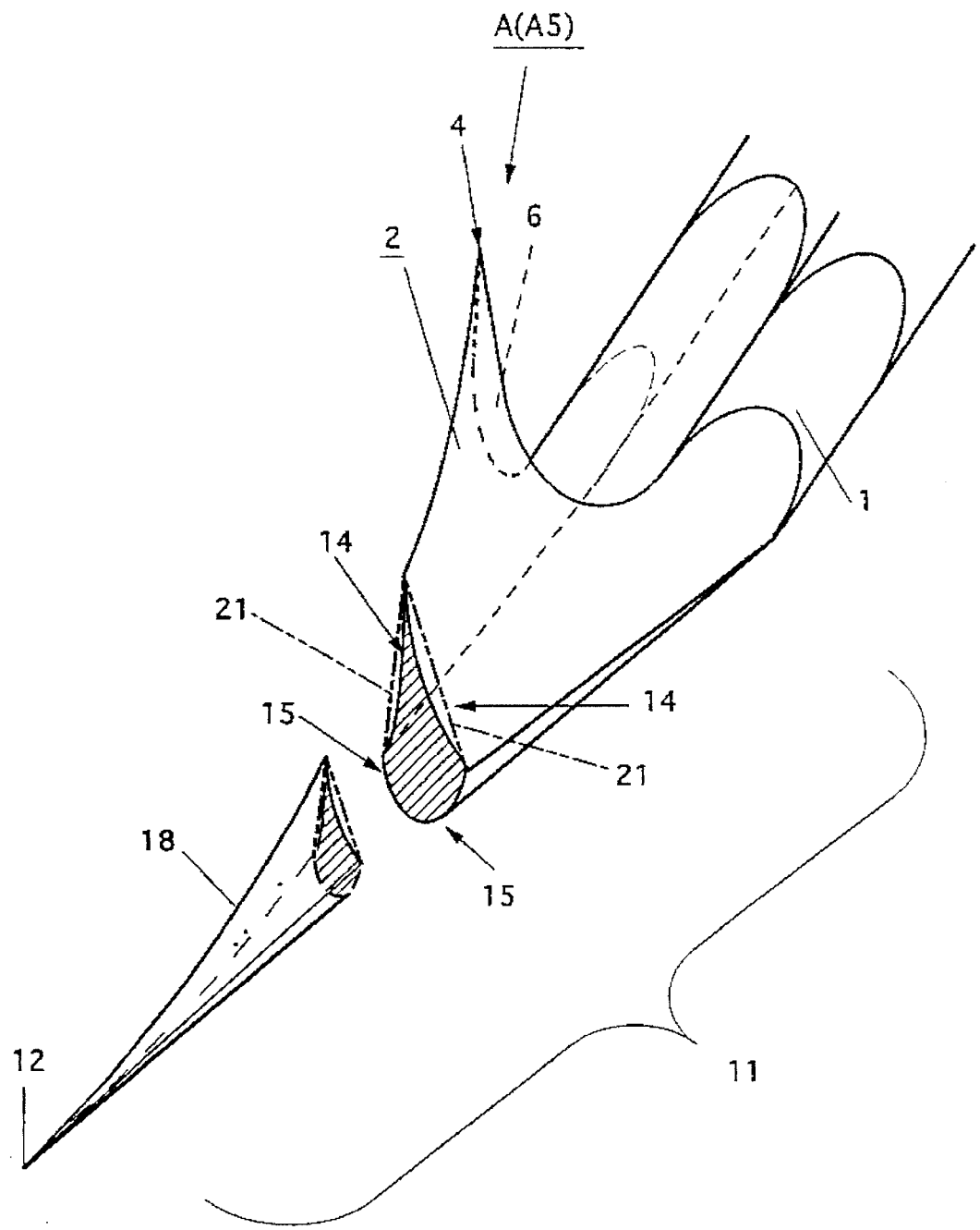
FIG. 8 is an enlarged perspective view illustrating a tip portion of a fishhook of a fifth embodiment produced in accordance with the second or third method of the present invention.
Figure 9:
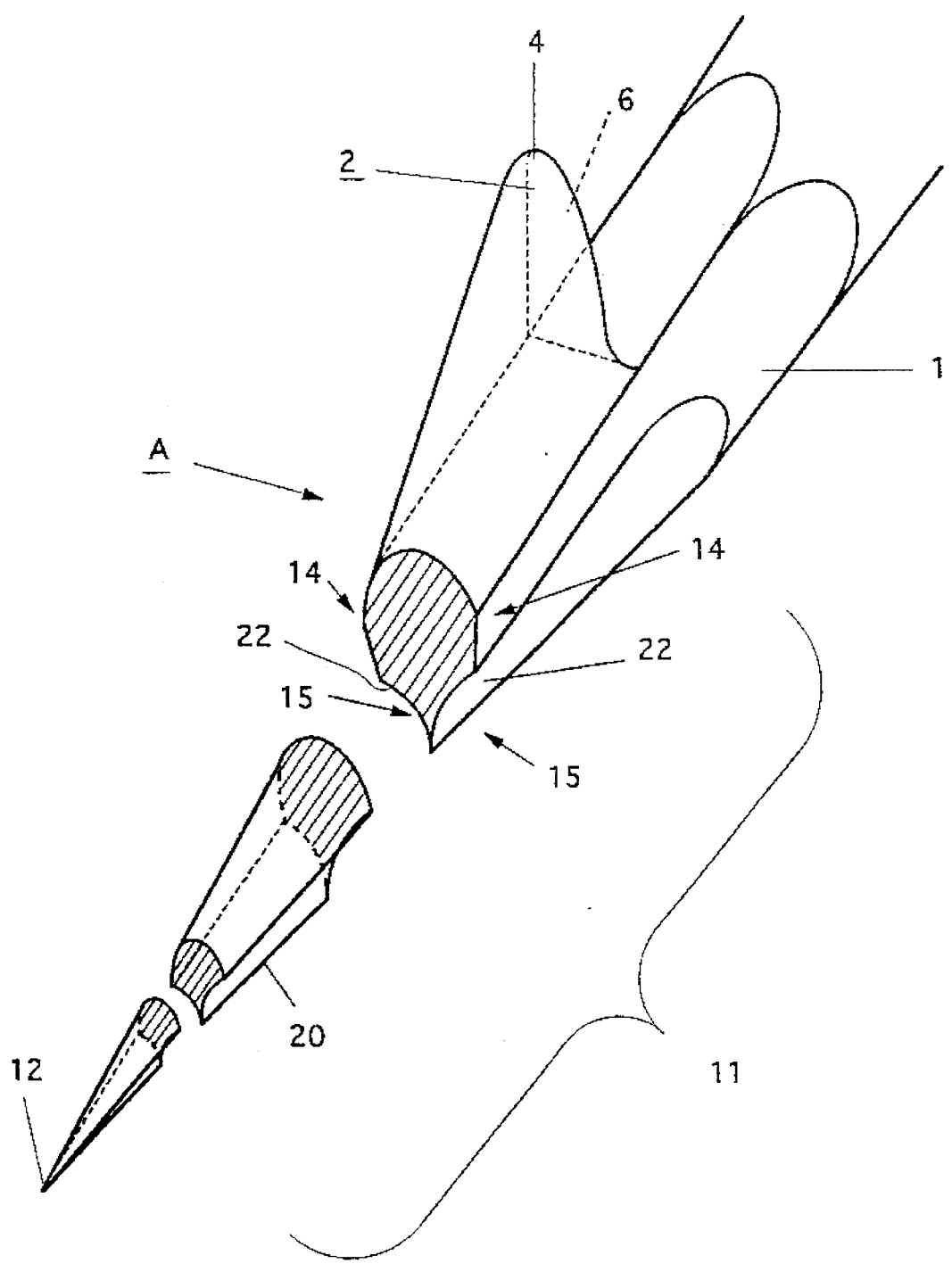
FIG. 9 is an enlarged perspective view illustrating a tip portion of a fishhook of a sixth embodiment produced in accordance with the second or third method of the present invention.
Figure 10:
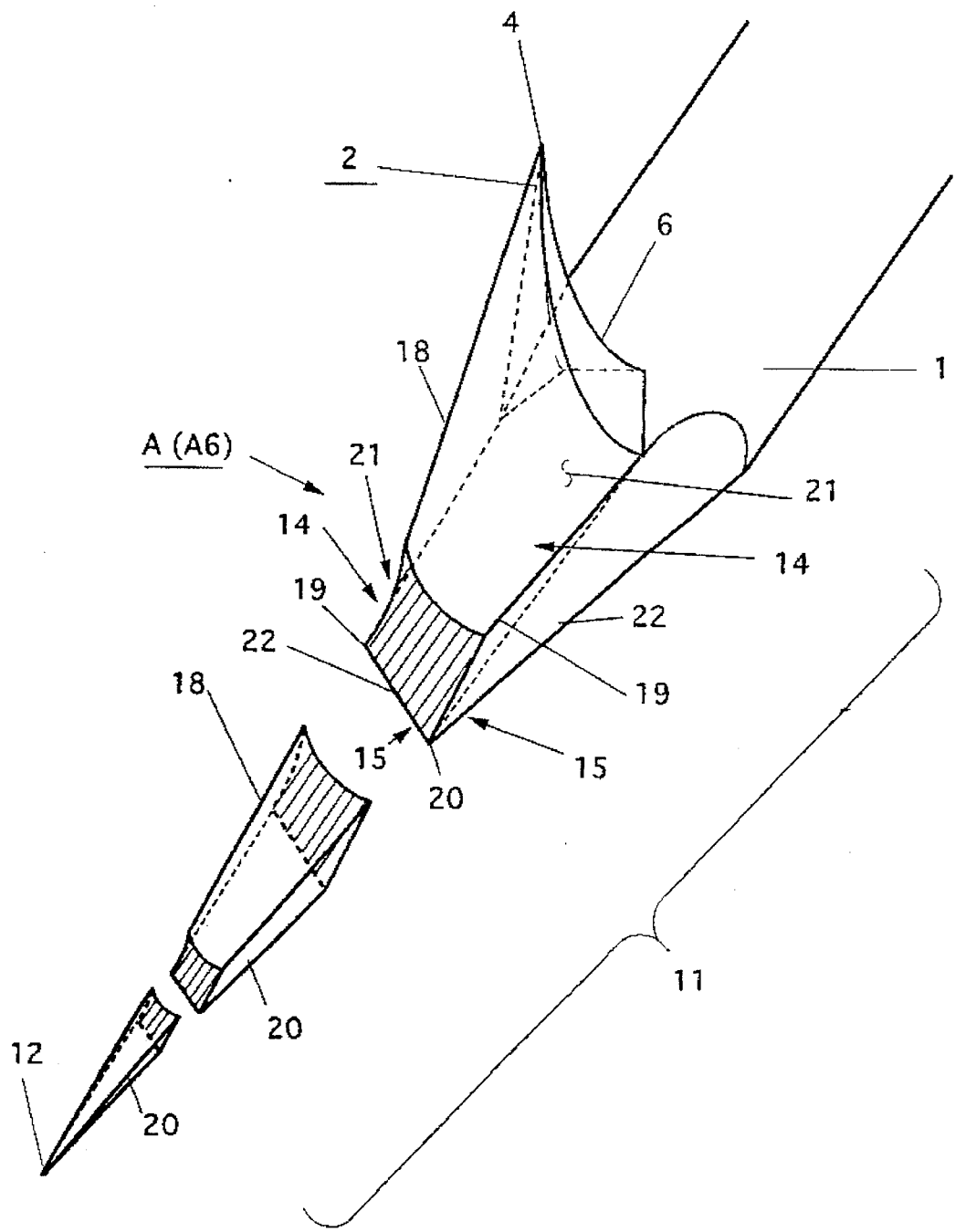
FIG. 10 is an enlarged perspective view illustrating a tip portion of a modified fishhook in accordance with the fourth, fifth and sixth embodiments of the present invention.

A fishhook A3 of a third preferred embodiment, as shown in FIG. 6, has lower lateral cut faces 22 formed along a tip portion 11 by cutting both lower lateral sides 15 of the tip portion 11 and an inverted-V-shaped ridge at the juncture of the lower lateral cut faces 22. In this case, the upper portion defined by the upper lateral sides 14 and top 17 which extends from a hook tip 12 to a barb 2 is kept arcuate in cross section. Like the second embodiment A2, though the squeezing resistance, of the fishhook A3 is relatively large because of the arcuate portion, the sharp bottom edge 20 on the bottom side serves to tear off the palate and flesh of a fish, thereby reducing the squeezing resistance compared with the conventional fishhooks. Of course, the aforesaid lateral cut faces 22 can be rendered concave.

FIGS. 7 to 10 show other embodiments of fishhooks produced in accordance with second and third production methods of the present invention. According to the second production method, as shown in FIG. 18, one end portion of a round rod blank S which is cut to a given length is pressed with press P1 to form a thin tip portion 11a (like a flat spatula), and either or both of upper lateral sides 14 and lower lateral sides 15 of the thin tip portion 11a are diagonally cut to form a sharp hook tip 12 and to form a barb 2 on the upper side of the tip portion 11. The lateral cut faces 21 and 22 are rendered flat or concave as previously mentioned, and along the junctures of the lateral cut faces 21 and 22 are formed sharp edges 18, 19 and 20. Then, the rear portion of the barb 2 on the side opposite to the hook tip 12 is chipped with press P2 to form rear face 6 of the barb 2 and, finally, a fishhook body 1 is bent such that the barb 2 faces opposite a J-shaped shank portion 10 of the fishhook A. A flat base portion 7 is formed in the same manner as the first production method.

FIGS. 19(a) through 19(e) show a variation of the second production method. The tip portion 11a is pressed with the bottom portion 16 thereof being supported on a die so that the pressed metal protrudes on a top surface 17. The thin tip portion 11a is diagonally cut from the top surface 17 to a tip bottom portion to form a sharp hook tip 12 and a barb 2. Finally, the rear portion of the barb 2 is chipped to form a rear face 6 of the barb 2.

FIGS. 20(a) through 20(e) show the third production method. A round rod blank 1 which is cut to a given length and has a conically ground tip portion is pressed with press P1 at the boundary area between the conical and cylindrical portions thereof to form an arcuately raised portion 2a for barb formation laterally projecting from the both sides of the rod blank 1 (or pressed on a die to form an arcuately raised portion for barb formation protruding on top surface 17), and then either or both of upper lateral sides 14 and lower lateral sides 15 are cut along a tip portion 11. In a first variation of this production method, the entire conical portion of the tip portion 11 is pressed, as shown in FIGS. 21(a) through 21(e). In a second variation, the entire conical portion of the tip portion 11 is pressed with the bottom portion 16 thereof being supported on a die, as shown in FIGS. 22(a) through 22(e).

The aforementioned fishhooks A4 to A6 thus produced are illustrated in FIGS. 7 to 10. These fishhooks do not have a step between the base portion 5 of the barb 2 and the fishhook body 1 generated by the press working, unlike the fishhooks according to the first, second and third embodiments of the present invention.

FIGS. 23(a) through 23(e) show the fourth production method of the present invention. The tip portion of a round rod blank 1 cut to a given length and conically ground at its tip end is cut and raised with a cutting tool (not shown) to form a projecting portion (2a) for barb formation. The portion of the projecting portion (2a) from tip to base thereof is chipped with a cutter to form a curved rear face 6 of the barb 2 while a fine crack produced in the base portion of the projecting portion 2a upon the formation of the projecting portion is removed. Subsequently, the lateral sides of the tip portion 11 are cut to form a sharp hook tip 12 and sharp edges 18, 19 and 20. This method provides the barb of the shape similar to that obtained by using press working.

According to the fishhooks of the present invention, the sharp edges cut along the tip portion reduce the squeezing resistance of the fishhook to the palate of a fish, hence even an inexperienced fisherman can easily hook a fish on the fishhook.

In addition, the concave lateral cut faces with relief flank formed along the tip portion reduce the contact resistance of the fishhook to the flesh of a fish, thereby facilitating the hooking of and squeezing into a fish.

Furthermore, since the fishhooks have a barb of a unique shape, the barb is not easily broken and even an inexperienced fisherman can easily remove a caught fish from the fishhook without heavily damaging the fish. Even if the fishhook catches the fisherman's clothes, the barb of the fishhook is not entangled in the fibers of the clothes, and the fishhook can be easily removed.

According to the production methods of the fishhooks of the present invention, the barb is formed by way of press working and, therefore, virtually any materials can be employed to produce the fishhooks.

While the present invention has been described in conjunction with preferred embodiments thereof, it will be understood that this description is intended to illustrate and not to limit the scope of the present invention, which is defined by the following claims.

What is claimed is:

1. A method of producing a fishhook comprising the steps of:

pressing an upper part of a tip portion of a fishhook body to form a thin raised portion for barb formation which arcuately projects from the upper part of the tip portion;

cutting a part of the thin raised portion on a side opposite an end of said tip portion to form a rear face of a barb; and bending the fishhook body such that the barb faces toward an interior of a J-shaped shank portion.

2. A method of producing a fishhook comprising the steps of:

pressing one side of a tip portion of a fishhook body to form a thin raised portion for barb formation arcuately projecting from said one side of the tip portion;

chipping a part of the thin raised portion on a side opposite an end of said tip portion by way of press working to form a rear face of a barb;

cutting at least either upper lateral sides or lower lateral sides of the tip portion from the hook tip to the barb to form flat or concave lateral cut faces and to form a sharp edge along a ridge at a juncture of said lateral cut faces; and bending the fishhook body such that the barb faces toward an interior of a J-shaped shank portion.

3. A method of producing a fishhook comprising the steps of:

pressing a tip portion of a fishhook body to form a thin flat portion;

cutting at least either upper lateral sides or lower lateral sides of the tip portion to form a sharp hook tip and a barb on an upper surface of the tip portion and to form flat or concave lateral cut faces with a sharp edge along a ridge at a juncture of the lateral cut faces;

chipping a part of the barb on a side opposite to the hook tip to form a rear face of the barb; and bending the fishhook body such that the barb faces toward an interior of a J-shaped shank portion.

* * * * *